US009621249B2

(12) United States Patent
Cordeiro

(10) Patent No.: US 9,621,249 B2
(45) Date of Patent: Apr. 11, 2017

(54) TECHNIQUES FOR VARIABLE CHANNEL BANDWIDTH SUPPORT

(71) Applicant: Intel Corporation, Santa Clara, CA (US)

(72) Inventor: Carlos Cordeiro, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 27 days.

(21) Appl. No.: 13/725,590

(22) Filed: Dec. 21, 2012

(65) Prior Publication Data

US 2014/0177543 A1 Jun. 26, 2014

(51) Int. Cl.
*H04W 80/04* (2009.01)
*H04W 88/06* (2009.01)
*H04W 28/04* (2009.01)
*H04W 72/04* (2009.01)
*H04B 7/06* (2006.01)
*H04W 74/04* (2009.01)

(52) U.S. Cl.
CPC ........... *H04B 7/0623* (2013.01); *H04W 74/04* (2013.01)

(58) Field of Classification Search
CPC .................................................... H04W 28/20
USPC ................................................. 370/329, 328
See application file for complete search history.

(56) References Cited

U.S. PATENT DOCUMENTS

| 2002/0093983 | A1* | 7/2002 | Newberg et al. ............. 370/468 |
| 2006/0030366 | A1 | 2/2006 | Park et al. |
| 2006/0203708 | A1 | 9/2006 | Sampath et al. |
| 2010/0111215 | A1* | 5/2010 | Nandagopalan ..... H04B 7/0617 375/267 |

(Continued)

FOREIGN PATENT DOCUMENTS

| KR | 1020080043448 | * 11/2006 |
| KR | 1020080043448 |   5/2008 |

(Continued)

OTHER PUBLICATIONS

International Search Report and Written Opinion received for PCT patent Application No. PCT/US2013/047468, mailed Oct. 15, 2013, 12 pages.

(Continued)

*Primary Examiner* — Jeffrey M Rutkowski
*Assistant Examiner* — Voster Preval

(57) ABSTRACT

Techniques for supporting variable channel bandwidths in a wireless communications network are described. In one embodiment, for example, an apparatus may comprise a processor circuit and a communications management module, and the communications management module may be operable by the processor circuit to determine a channel bandwidth for communication over a channel of a wireless network, transmit a beamforming initiation message comprising a channel bandwidth parameter indicating the determined channel bandwidth, receive a beamforming initiation confirmation message confirming the channel bandwidth parameter, perform a beamforming training sequence to (Continued)

determine one or more beamforming parameters, and transmit one or more messages over the channel according to the determined channel bandwidth and the one or more beamforming parameters. Other embodiments are described and claimed.

18 Claims, 16 Drawing Sheets

(56) References Cited

U.S. PATENT DOCUMENTS

| | | | | |
|---|---|---|---|---|
| 2010/0128679 A1* | 5/2010 | Kwon | ............... | H04L 12/2838 370/329 |
| 2010/0215027 A1* | 8/2010 | Liu | ............... | H04B 7/0695 370/338 |
| 2010/0290406 A1 | 11/2010 | Miki et al. | | |
| 2011/0116487 A1* | 5/2011 | Grandhi | ............... | H04W 72/1278 370/338 |
| 2013/0044877 A1* | 2/2013 | Liu | ............... | H04W 8/26 380/270 |
| 2013/0128807 A1* | 5/2013 | Vermani | ............... | H04L 5/0053 370/328 |
| 2013/0301569 A1* | 11/2013 | Wang | ............... | H04L 5/0055 370/329 |
| 2014/0148107 A1* | 5/2014 | Maltsev | ............... | H04B 1/02 455/91 |

FOREIGN PATENT DOCUMENTS

| | | | |
|---|---|---|---|
| KR | 1020080043448 A2 * | 5/2008 | |
| KR | 1020110034317 | 4/2011 | |
| KR | 1020110034317 A2 * | 4/2011 | |

OTHER PUBLICATIONS

IEEE 802.11ad™ D9.0, Draft Standard for InformationTechnology—Telecommunications and Information Exchange Between Systems—Local and Metropolitan Area Networks—Specific Requirements—Jul. 2012, (Author Unknown), 685 pages.

* cited by examiner

FIG. 5A
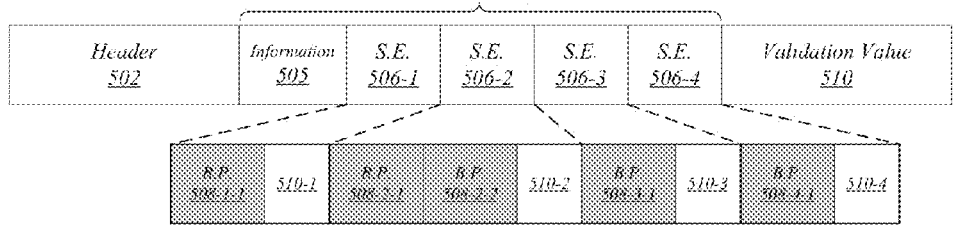
FIG. 5B
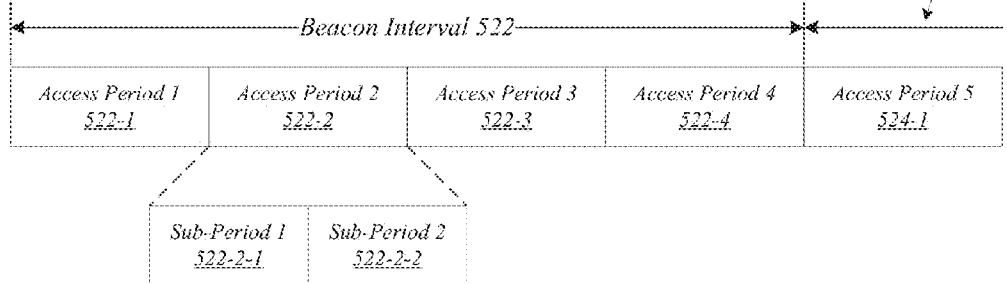
FIG. 5C
| Access Period | Channel Bandwidth |
|---|---|
| Access Period 1 | 40 MHz |
| Access Period 2, Sub-Period 1 | 20 MHz |
| Access Period 2, Sub-Period 2 | 40 MHz |
| Access Period 3 | 80 MHz |
| Access Period 4 | 60 MHZ |

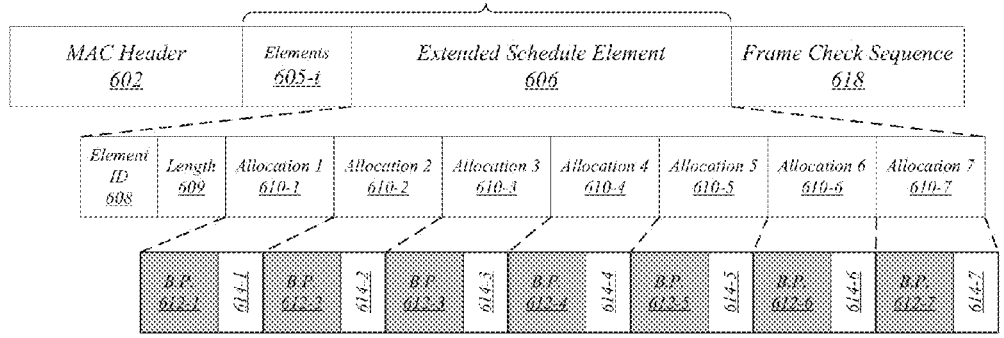
FIG. 6A
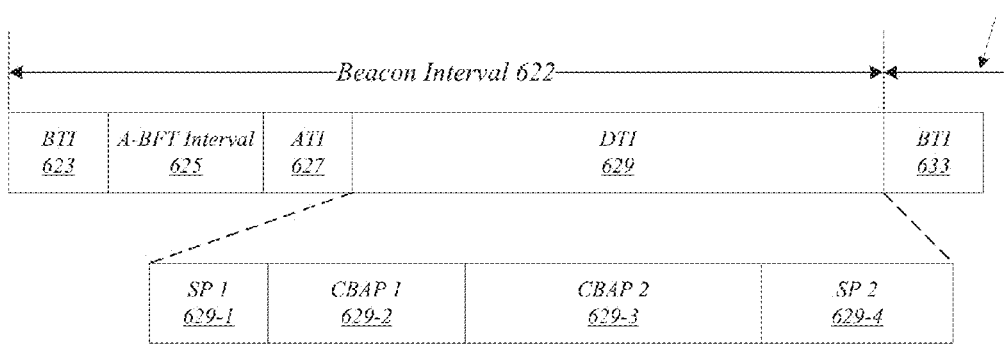
FIG. 6B
FIG. 6C
| Access Period | Channel Bandwidth |
|---|---|
| BTI | CH_BW |
| A-BFT Interval | CH_BW |
| ATI | CH_BW |
| DTI, SP 1 | CH_BW*2 |
| DTI, CBAP 1 | CH_BW/2 |
| DTI, CBAP 2 | CH_BW |
| DTI, SP 2 | CH_BW*3 |

DETERMINE CHANNEL BANDWIDTH FOR CHANNEL FOR ACCESS PERIOD IN BEACON INTERVAL
1202

GENERATE BEACON MESSAGE COMPRISING SCHEDULING ELEMENT DEFINING ACCESS PERIOD AND CHANNEL BANDWIDTH PARAMETER INDICATING CHANNEL BANDWIDTH
1204

TRANSMIT BEACON MESSAGE
1206

RECEIVE BEACON MESSAGE COMPRISING SCHEDULING ELEMENT DEFINING ACCESS PERIOD AND CHANNEL BANDWIDTH PARAMETER INDICATING CHANNEL BANDWIDTH
1302

DETERMINE CHANNEL BANDWIDTH FOR CHANNEL DURING ACCESS PERIOD BASED ON CHANNEL BANDWIDTH PARAMETER IN BEACON MESSAGE
1304

TRANSMIT ONE OR MORE MESSAGES OVER CHANNEL DURING ACCESS PERIOD BASED ON CHANNEL BANDWIDTH
1306

TECHNIQUES FOR VARIABLE CHANNEL BANDWIDTH SUPPORT

BACKGROUND

In a wireless network in which a standard channel bandwidth is defined for communication channels therein, it may be desirable to enable capable devices to select and communicate according to channel bandwidths that differ from the standard bandwidth. For example, it may be desirable to support channel bonding, in which multiple standard-sized channels are combined, and/or channel halving, in which a standard-sized channel is divided into two non-standard sized channels. However, modifying a communications protocol for a wireless network according to techniques for supporting variable channel bandwidth that are not backwards compatible with the protocol implemented by existing devices may cause those devices to become unable to communicate over the wireless network. As such, techniques for supporting variable channel bandwidth while maintaining backwards compatibility for existing devices may be desirable.

BRIEF DESCRIPTION OF THE DRAWINGS

FIG. 5A illustrates one embodiment of a first beacon message.

FIG. 5B illustrates one embodiment of a first beacon interval.

FIG. 5C illustrates one embodiment of a first channel bandwidth schedule.

FIG. 6A illustrates one embodiment of a second beacon message.

FIG. 6B illustrates one embodiment of a second beacon interval.

FIG. 6C illustrates one embodiment of a second channel bandwidth schedule.

FIG. 12 illustrates one embodiment of a third logic flow.
FIG. 13 illustrates one embodiment of a fourth logic flow.

DETAILED DESCRIPTION

Various embodiments may be generally directed to techniques for supporting variable channel bandwidths in a wireless communications network. In one embodiment, for example, an apparatus may comprise a processor circuit and a communications management module, and the communications management module may be operable by the processor circuit to determine a channel bandwidth for communication over a channel of a wireless network, transmit a beamforming initiation message comprising a channel bandwidth parameter indicating the determined channel bandwidth, receive a beamforming initiation confirmation message confirming the channel bandwidth parameter, perform a beamforming training sequence to determine one or more beamforming parameters, and transmit one or more messages over the channel according to the determined channel bandwidth and the one or more beamforming parameters. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
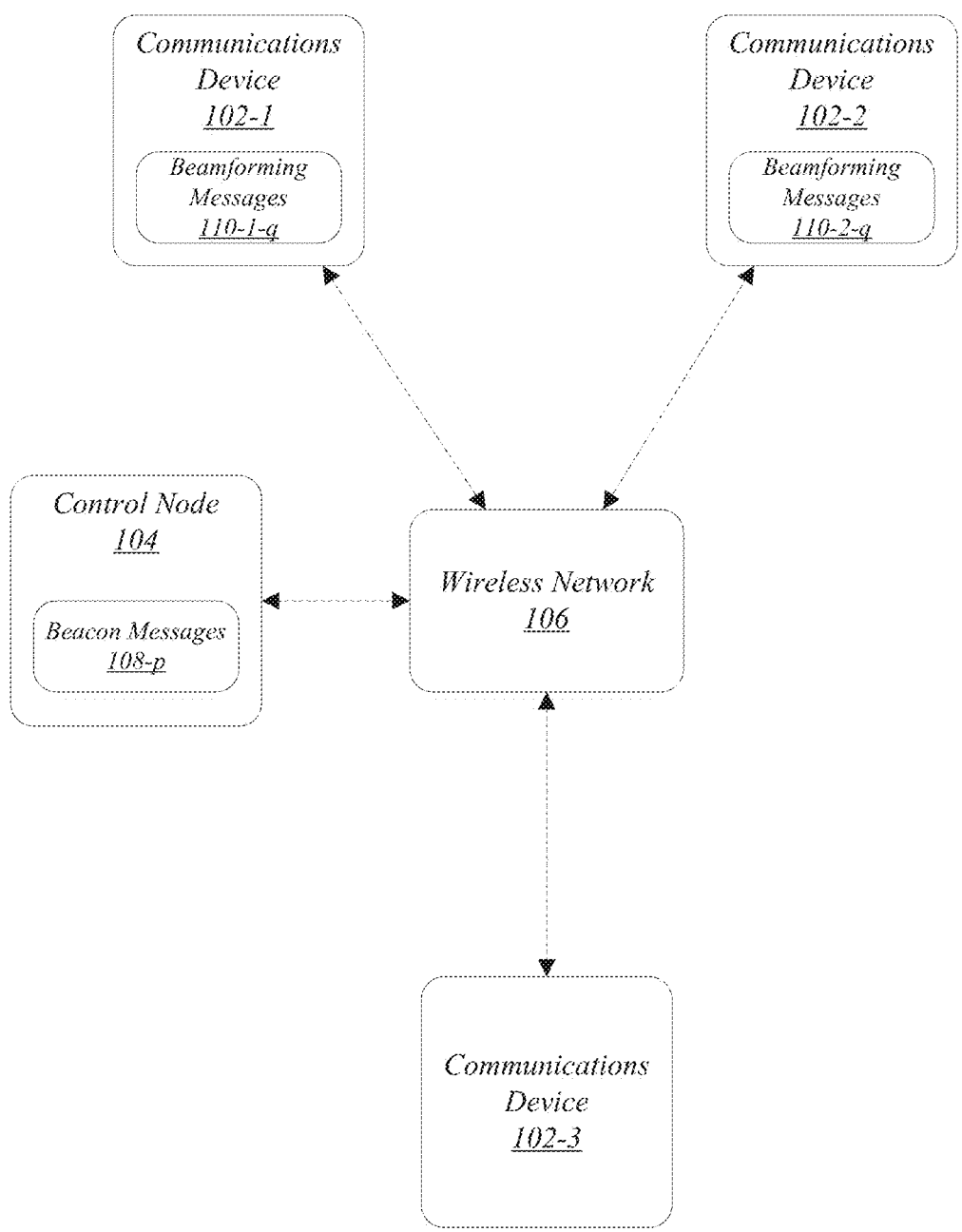
FIG. 1 illustrates one embodiment of a first communications environment.

FIG. 1 illustrates an example of a communications system 100 according to various embodiments. As shown in FIG. 1, communications devices 102-1, 102-2, and 102-3 and control node 104 communicate over a wireless network 106. In some embodiments, wireless network 106 may comprise a 60 GHz multi-gigabit wireless network. For example, in various embodiments, wireless network 106 may be implemented according to Wireless Gigabit Alliance Wireless Gigabit ("WiGig") Specification Version 1.0, according to Institute of Electrical and Electronics Engineers (IEEE) Draft Standard P802.11ad™/D9.0, published July 2012, titled "Amendment 3: Enhancements for Very High Throughput in the 60 GHz Band," ("IEEE 802.11ad Revision 9.0") or according to any predecessors, revisions, or variants thereof (collectively, "the WiGig/802.11ad Standards"). Hereinafter, for purposes of brevity, embodiments comprising a WiGig/802.11ad wireless network—such as embodiments of communications system 100 of FIG. 1 in which wireless network 106 comprises a WiGig/802.11ad wireless network—shall be referred to as "802.11ad embodiments." It is to be understood that embodiments are also possible and contemplated that do not comprise a WiGig/802.11ad wireless network, and that the embodiments are not limited in this context.

In some embodiments, communications devices 102-1, 102-2, and 102-3 may comprise mobile and/or fixed wireless devices capable of communicating according to a wireless communications protocol of wireless network 106. In various 802.11ad embodiments, communications devices 102-1, 102-2, and 102-3 may comprise directional multi-gigabit (DMG) stations (STAs) operative to communicate over wireless network 106 according to the WiGig/802.11ad Standards. It is worthy of note that although there are three communications devices illustrated in the example of FIG. 1, greater or lesser numbers of devices may communicate over a wireless network such as wireless network 106 in some embodiments. Hereinafter, the group of communications devices in FIG. 1 shall be referred to as communications devices 102-n. It is worthy of note that "n" and similar designators as used herein are intended to be variables representing any positive integer. Thus, for example, if an implementation sets a value for n=3, then a complete set of communications devices 102-n may include communications devices 102-1, 102-2, and 102-3, as is the case in FIG. 1. The embodiments are not limited in this respect.

In various embodiments, communications of communications devices 102-n over wireless network 106 may be managed and/or configured by control node 104. Control node 104 may comprise any communications device capable of communicating according to the wireless communications protocol of wireless network 106 and of managing and/or configuring the communications of communications devices 102-n over wireless network 106. In some 802.11ad embodiments, control node 104 may comprise a personal basic service set (PBSS) control point (PCP) and/or an access point (AP) according to the WiGig/802.11ad Standards. In various embodiments, control node 104 may be operative to determine one or more communications parameters governing communication by one or more communications devices 102-n over wireless network 106. It is worthy of note that in some embodiments, control node 104 may itself comprise a communications device, and may operative to determine one or more communications parameters governing its own communication over wireless network 106. For example, in various 802.11ad embodiments, control node 104 may comprise an 802.11ad PCP, and thus may itself constitute an 802.11ad STA, and may determine one or more communications parameters governing communication between itself and a communications device 102-n over wireless network 106. The embodiments are not limited in this regard.

In some embodiments, control node 104 may be operative to periodically transmit beacon messages 108-p to communications devices 102-n. Successive beacon messages 108-p may define a beacon interval, comprising the time period between the transmission of the successive beacon messages 108-p. In various embodiments, each beacon message 108-p may comprise communications parameters governing communication by one or more communications devices 102-n during a corresponding beacon interval. In some embodiments, communications devices 102-n may be operative to periodically receive beacon messages 108-p from control node 104 and, for each beacon message 108-p, conform to the communications parameters comprised within that beacon message 108-p when communicating during a corresponding beacon interval. In various 802.11ad embodiments, beacon messages 108-p may comprise 802.11ad DMG beacon frames and/or Announce frames, and the beacon interval may comprise an 802.11ad beacon interval. The embodiments are not limited in this context.

In some embodiments, beacon messages 108-p may comprise communications parameters defining one or more access periods within their corresponding beacon intervals. For example, in various 802.11ad embodiments, beacon messages 108-p may comprise 802.11ad DMG beacon frames and/or Announce frames, and each may comprise communications parameters defining a beacon transmission interval (BTI), an association beamforming training (A-BFT) interval, an announcement transmission interval (ATI), and/or a data transmission interval (DTI) within its corresponding beacon interval according to the WiGig/802.11ad Standards. In some embodiments, for each defined access period that a beacon message 108-p defines, the beacon message 108-p may comprise communications parameters defining communications rules and/or protocols governing communications during that access period. The embodiments are not limited in this context.

In various embodiments, some or all of communications devices 102-n may be operative to perform beamforming operations in conjunction with their communications over wireless network 106. In some embodiments, some or all of communications devices 102-n may be operative to transmit one or more beamforming messages 110-n-q in conjunction with such beamforming operations. In various embodiments, two particular communications devices 102-n that communicate with each other over wireless network 106 may be operative to exchange one or more beamforming messages 110-n-q in conjunction with beamforming operations for their communications over wireless network 106. For example, in some embodiments, communications device 102-1 may transmit one or more beamforming messages 110-1-q to communications device 102-2, receive one or more beamforming messages 110-2-q from communications device 102-2 in response, and determine beamforming parameters for a subsequent transmission to communications device 102-2 based on this exchange of beamforming messages. In various 802.11ad embodiments, some or all of communications devices 102-n may be operative to transmit one or more beamforming training frames according to the WiGig/802.11ad Standards. In some such 802.11ad embodiments, the one or more beamforming training frames may comprise one or more 802.11ad Sector Sweep (SSW) frames, SSW Feedback frames, SSW Acknowledgement (ACK) frames, DMG Beacon frames, Grant frames, Grant ACK frames, and/or Beam Refinement Protocol (BRP) frames. The embodiments are not limited in this context.

In conventional systems, a standard bandwidth may be defined for communications channels of a wireless network such as wireless network 104 of FIG. 1, and communications devices such as communications devices 102-n of FIG. 1 may be required to communicate according to that standard bandwidth. Such conventional systems may be referred to as fixed channel bandwidth systems. For example, some conventional systems may comprise WiGig/802.11ad networks in which a fixed channel bandwidth CH_BANDWIDTH is defined with a value equal to 2160 MHz, and STAs that communicate during the DTIs of the beacon intervals are required to communicate according that fixed channel bandwidth.

There may be potential benefits associated with the use of channel bandwidths differing from the standard bandwidth in such systems. For example, in situations in which throughput is at a premium and power consumption is not as important of an issue, the ability to perform channel bonding—the combination of multiple standard-sized channels into a single larger channel—may be beneficial. Similarly, in situations in which throughput is ample and power consumption is excessive and/or in which local regulatory requirements restrict the bandwidths of communications channels, the ability to perform channel splitting—the division of a single standard-sized channel into multiple smaller channels—may be beneficial. However, the use of a fixed channel bandwidth in conventional systems may preclude those systems from realizing such potential benefits. In order to improve upon conventional systems, techniques to enable the selection of—and communication according to—variable channel bandwidths may be desirable. More particularly, techniques may be desirable for implementing variable channel bandwidth communications systems in which capable devices are able to select and communicate according to variable channel bandwidths, while backwards compatibility is maintained for existing, non-capable devices such that their ability to communicate over the network is preserved. The embodiments are not limited in this context.

Figure 2:
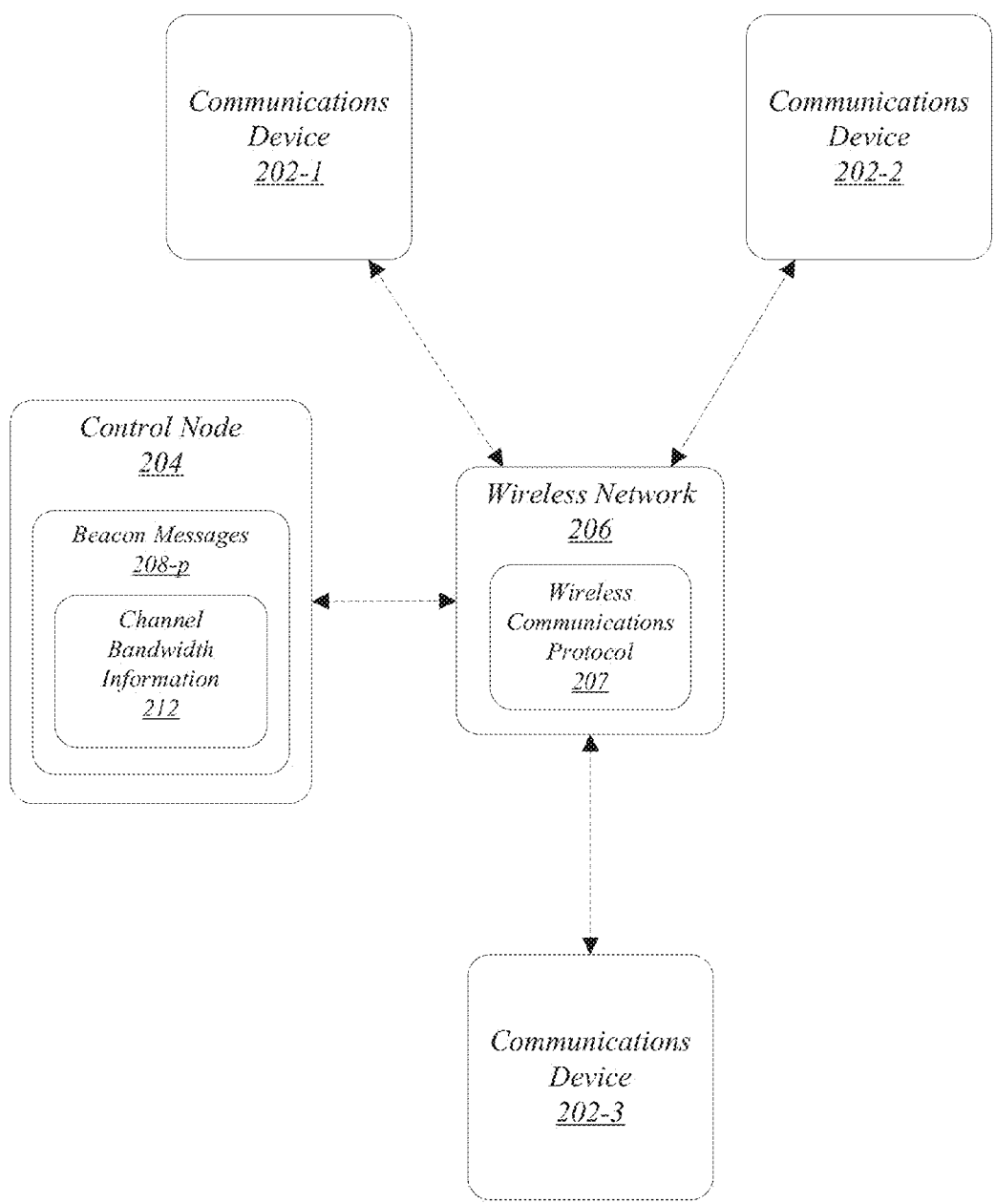
FIG. 2 illustrates one embodiment of a second communications environment.

FIG. 2 illustrates an embodiment of a variable channel bandwidth communications system 200 according to various embodiments. As shown in FIG. 2, communications devices 202-1, 202-2, and 202-3 and control node 204 communicate over a wireless network 206. In some embodiments, wireless network 206 may comprise a 60 GHz multi-gigabit wireless network. For example, in various embodiments, wireless network 206 may comprise a WiGig/802.11ad wireless network. In some embodiments, wireless network 206 may be implemented according to a wireless communications protocol 207 that enables the implementation of variable channel bandwidths for communications channels of wireless network 206. For example, in various 802.11ad embodiments, wireless communications protocol 207 may comprise modifications of the WiGig/802.11ad Standards that enable the implementation of variable channel bandwidths for communications channels of WiGig/802.11ad wireless networks. The embodiments are not limited in this context.

In some embodiments, control node 204 may be operative to periodically transmit beacon messages 208-$p$ to communications devices 202-$n$. In various embodiments, wireless communications protocol 207 may enable the implementation of variable channel bandwidths for communications channels of wireless network 206 by accommodating the inclusion of channel bandwidth information 212 in beacon messages 208-$p$. In some embodiments, communications devices 202-$n$ that receive beacon messages 208-$p$ comprising channel bandwidth information 212 may communicate over communications channels of wireless network 206 according to that channel bandwidth information 212. In various embodiments, wireless communications protocol 207 may comprise an updated and/or modified version of a previous protocol. In some embodiments, some communications devices 202-$n$ may operate according to the previous protocol rather than according to wireless communications protocol 207. In various embodiments, wireless communications protocol 207 may specify a structure for beacon messages 208-$p$ such that communications devices 202-$n$ that operate according to the previous protocol and cannot process channel bandwidth information 212 within beacon messages 208-$p$ are still able to process the remaining contents of beacon messages 208-$p$ and are thus still able to communicate over wireless network 206. As such, wireless communications protocol 207 may support variable channel bandwidths while maintaining backwards compatibility for devices operating according to the previous protocol. The embodiments are not limited in this context.

Figure 3:
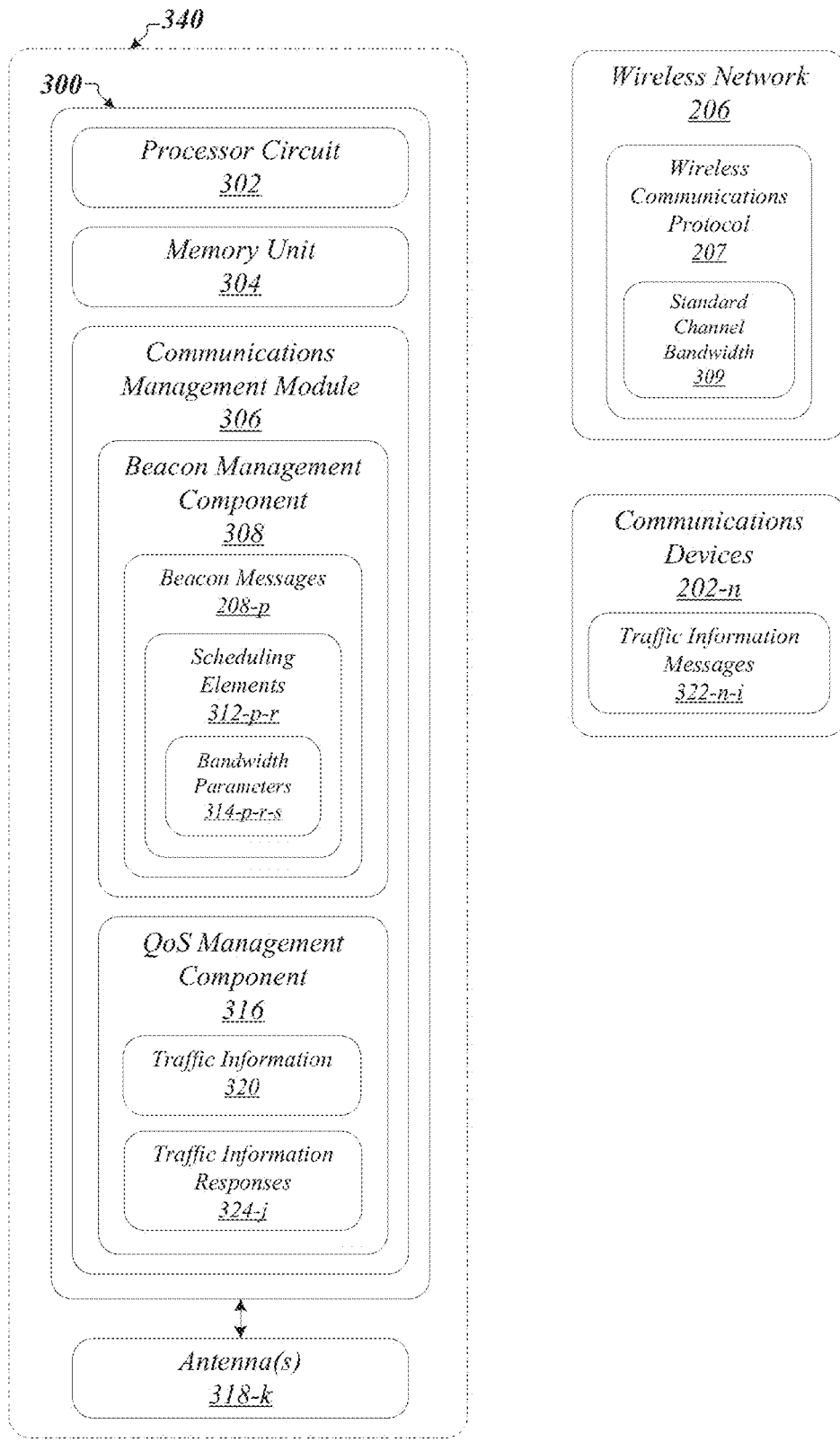
FIG. 3 illustrates one embodiment of a first apparatus and one embodiment of a first system.

FIG. 3 illustrates an apparatus 300 such as may comprise an example of a control node 204 of FIG. 2 according to some embodiments. As shown in FIG. 3, apparatus 300 comprises multiple elements including a processor circuit 302, a memory unit 304, and a communications management module 306. The embodiments, however, are not limited to the type, number, or arrangement of elements shown in this figure.

In various embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise communications management module 306. Communications management module 306 may comprise logic, circuitry, or instructions operative to manage and/or configure the communications of one or more communications devices 202-$n$ over a wireless network 206. In some embodiments, communications management module 306 may also comprise logic, circuitry, or instructions operative to manage communications of apparatus 300 over the wireless network 206. The embodiments are not limited in this context.

FIG. 3 also illustrates a block diagram of a system 340. System 340 may comprise any of the aforementioned elements of apparatus 300. System 340 may further comprise one or more antennas 318-$k$. Antennas 318-$k$ may comprise an antenna array in various embodiments. In some embodiments, apparatus 300 may be operative to transmit one or more messages over wireless network 206 using antennas 318-$k$. In various embodiments, apparatus 300 may be operative to perform one or more beamforming operations in conjunction with using antennas 318-$k$ to transmit one or more messages over wireless network 206. The embodiments are not limited in this respect.

In general operation, apparatus 300 and/or system 340 may be operative to configure variable channel bandwidths for communication by one or more communications devices 202-$n$ over wireless network 206. In some embodiments, communications management module 306 may comprise beacon management component 308. Beacon management component 308 may comprise logic, circuitry, or instructions operative to generate and/or manage one or more beacon messages 208-$p$ according to the wireless communications protocol 207 for the wireless network 206. In various embodiments, communications management module 306 may be operative on antennas 318-$k$ to transmit the one or more beacon messages 208-$p$ to one or more communications devices 202-$n$ over wireless network 206. The embodiments are not limited in this context.

In some embodiments, beacon management component 308 may be operative to generate one or more beacon messages 208-$p$ comprising one or more corresponding scheduling elements 312-$p$-$r$. In various embodiments, the scheduling elements 312-$p$-$r$ within any particular beacon message 208-$p$ may define one or more access periods within the subsequent beacon interval corresponding to that particular beacon message 208-$p$. In some embodiments, scheduling elements 312-$p$-$r$ may comprise bandwidth parameters 314-$p$-$r$-$s$. In various embodiments, a bandwidth parameter 314-$p$-$r$-$s$ within a particular scheduling element 312-$p$-$r$ of a beacon message 208-$p$ may indicate a channel bandwidth to be used for communication over a channel of wireless network 206 during an access period defined by that particular scheduling element 312-$p$-$r$. In some embodiments, varying channel bandwidths may be indicated by the various bandwidth parameters 314-$p$-$r$-$s$. In various embodiments, for a particular access period defined by a particular scheduling element 312-$p$-$r$, the scheduling element 312-$p$-$r$ may define one or more sub-periods within that particular access period. In some such embodiments, the bandwidth parameters 314-$p$-$r$-$s$ within that particular scheduling element may comprise one or more bandwidth parameters 314-$p$-$r$-$s$ indicating channel bandwidths to be used during one or more of those sub-periods. In various embodiments, the one or more bandwidth parameters 314-$p$-$r$-$s$ may indicate different channel bandwidths for different sub-periods of a particular access period.

In some embodiments, beacon management component 308 may be operative to generate beacon messages 208-$p$, scheduling elements 312-$p$-$r$, and bandwidth parameters 314-$p$-$r$-$s$ in compliance with a format specified by wireless communications protocol 207. In various embodiments, wireless communications protocol 207 may specify a standard channel bandwidth 309, and one or more of bandwidth parameters 314-$p$-$r$-$s$ may indicate channel bandwidths that differ from the standard channel bandwidth 309. In some such embodiments, one or more of bandwidth parameters 314-$p$-$r$-$s$ may indicate channel bandwidths that comprise positive multiples of standard channel bandwidth 309 and/or positive fractions of standard channel bandwidth 309. In various embodiments, one or more of bandwidth parameters 314-$p$-$r$-$s$ may indicate channel bandwidths that comprise positive integer multiples of standard channel bandwidth 309. In an example embodiment, a particular bandwidth parameter 314-$p$-$r$-$s$ may indicate a channel bandwidth equal to the standard channel bandwidth 309 multiplied by 3. In some embodiments, one or more of bandwidth parameters 314-$p$-$r$-$s$ may indicate channel bandwidths that comprise proper common fractions of standard channel bandwidth 309. In an example embodiment, a particular bandwidth parameter 314-$p$-$r$-$s$ may indicate a channel bandwidth equal to the standard channel bandwidth 309 divided by 3. It is to be understood that in various embodiments, bandwidth parameters 314-$p$-$r$-$s$ may indicate non-integer multiples and/or fractions of standard channel bandwidth 309, and the embodiments are not limited in this context.

In some 802.11ad embodiments, wireless communications protocol 207 may comprise modifications of the WiGig/802.11ad Standards that enable the implementation of variable channel bandwidths. In various such 802.11ad embodiments, apparatus 300 and/or system 340 may comprise a PCP and/or AP, and may be operative to periodically transmit beacon messages 208-$p$ comprising DMG beacon frames and/or Announce frames. In some 802.11ad embodiments, scheduling elements 312-$p$-$r$ may comprise 802.11ad Extended Schedule elements, and each may define one or more access periods within a beacon interval corresponding to its DMG beacon frame or Announce frame. In various 802.11ad embodiments, the access periods defined by a scheduling element 312-$p$-$r$ comprising an Extended Schedule element may comprise a BTI, an A-BFT interval, an ATI, and/or a DTI. In some 802.11ad embodiments, a particular bandwidth parameter 314-$p$-$r$-$s$ within such a scheduling element 312-$p$-$r$ may indicate a channel bandwidth to be used for communication over a channel of the WiGig/802.11ad wireless network during one or more of the BTI, the A-BFT interval, the ATI, and the DTI. In various 802.11ad embodiments, varying channel bandwidths may be indicated by the various bandwidth parameters 314-$p$-$r$-$s$. In some 802.11ad embodiments, one or more scheduling elements 312-$p$-$r$ for a beacon interval may define one or more sub-periods within a BTI, an A-BFT interval, and ATI, and/or a DTI. For example, in various 802.11ad embodiments, one or more scheduling elements 312-$p$-$r$ may define one or more sub-periods within an 802.11ad DTI. Such sub-periods may comprise one or more contention-based access periods (CBAPs) and/or one or more scheduled services periods (SPs) in some embodiments. The embodiments are not limited in this context.

In various such 802.11ad embodiments, the scheduling elements 312-$p$-$r$ may comprise bandwidth parameters 314-$p$-$r$-$s$ indicating channel bandwidths to be used during one or more of the sub-periods of the DTI. In some 802.11ad embodiments, the bandwidth parameters 314-$p$-$r$-$s$ may indicate different channel bandwidths for different sub-periods of the DTI. In various 802.11ad embodiments, the indicated channel bandwidths may comprise multiples of and/or fractions of the standard channel bandwidth CH_BANDWIDTH for the WiGig/802.11ad wireless network. The embodiments are not limited in this context.

In some embodiments, communications devices 202-$n$ may be operative to receive beacon messages 208-$p$ comprising scheduling elements 312-$p$-$r$, and to identify access periods within corresponding beacon intervals based on the scheduling elements 312-$p$-$r$. In various embodiments, for any particular access period or sub-period defined by a scheduling element 312-$p$-$r$, communications devices 202-$n$ may be operative to determine a channel bandwidth to be used for communication over a channel of wireless network 206 during that particular access period or sub-period, based on one or more bandwidth parameters 314-$p$-$r$-$s$ comprised within that scheduling element 312-$p$-$r$. For example, in some 802.11ad embodiments, communications devices 202-$n$ may comprise STAs and may be operative to determine a channel bandwidth to be used for communication over a channel of the WiGig/802.11ad wireless network during a CBAP within the DTI of the beacon interval. In various embodiments, after determining a channel bandwidth to be used for communication over a channel of wireless network 206, one or more of communications devices 202-$n$ may communicate over that channel according to that determined channel bandwidth. The embodiments are not limited in this context.

In some embodiments, apparatus 300 and/or system 340 may comprise quality-of-service (QoS) management component 316. QoS management component 316 may be operative in various embodiments to implement, configure, and/or manage a QoS management scheme for wireless network 206. Such a QoS management scheme may be operative to monitor traffic over wireless network 206 and to manage communications over wireless network 206 by one or more communications devices 202-n according to characteristics of such traffic and according to QoS parameters defined by wireless communications protocol 207. In some embodiments, QoS management component 316 may be operative to generate and/or maintain traffic information 320. Traffic information 320 may comprise information describing traffic over wireless network 206. For example, traffic information 320 may indicate that a certain number of communications devices 202-n are communicating over wireless network 206 at a particular time. The embodiments are not limited in this context.

In various embodiments, apparatus 300 and/or system 340 may be operative to receive traffic information messages 322-n-i from one or more communications devices 202-n. A particular traffic information message 322-n-i for a particular communications device 202-n may describe characteristics of communications being performed by that communications device 202-n over wireless network 206. For example, apparatus 300 and/or system 340 may be operative to receive from a communications device 202-n a traffic information message 322-n-i indicating a channel bandwidth of an ongoing communication of the communications device 202-n over wireless network 206. In such an example, the traffic information message 322-n-i may comprise a bandwidth parameter 314-p-r-s that indicates the bandwidth of the channel being used by the communications device 202-n. In some embodiments, a bandwidth parameter 314-p-r-s comprised within a traffic information message 322-n-i received from a communications device 202-n may describe a channel bandwidth according to which that communications device 202-n is communicating, based on having received a beacon message 208-p comprising a bandwidth parameter 314-p-r-s indicating that channel bandwidth. In various 802.11ad embodiments, traffic information messages 322-n-i may comprise add traffic stream (ADDTS) request messages received from one or more STAs. The embodiments are not limited in this context.

In some embodiments, QoS management component 316 may be operative to update traffic information 320 and generate traffic information responses 324-j based on traffic information messages 322-n-i. Traffic information responses 324-j may comprise confirmation messages for the received traffic information messages 322-n-i. In various embodiments, in response to any particular traffic information message 322-n-i received from any particular communications device 202-n, QoS management component 316 may be operative to generate a traffic information response 324-j comprising a bandwidth parameter 314-p-r-s matching that within the received traffic information message 322-n-i. In some 802.11ad embodiments, traffic information responses 324-j may comprise ADDTS response messages. The embodiments are not limited in this context.

Figure 4:
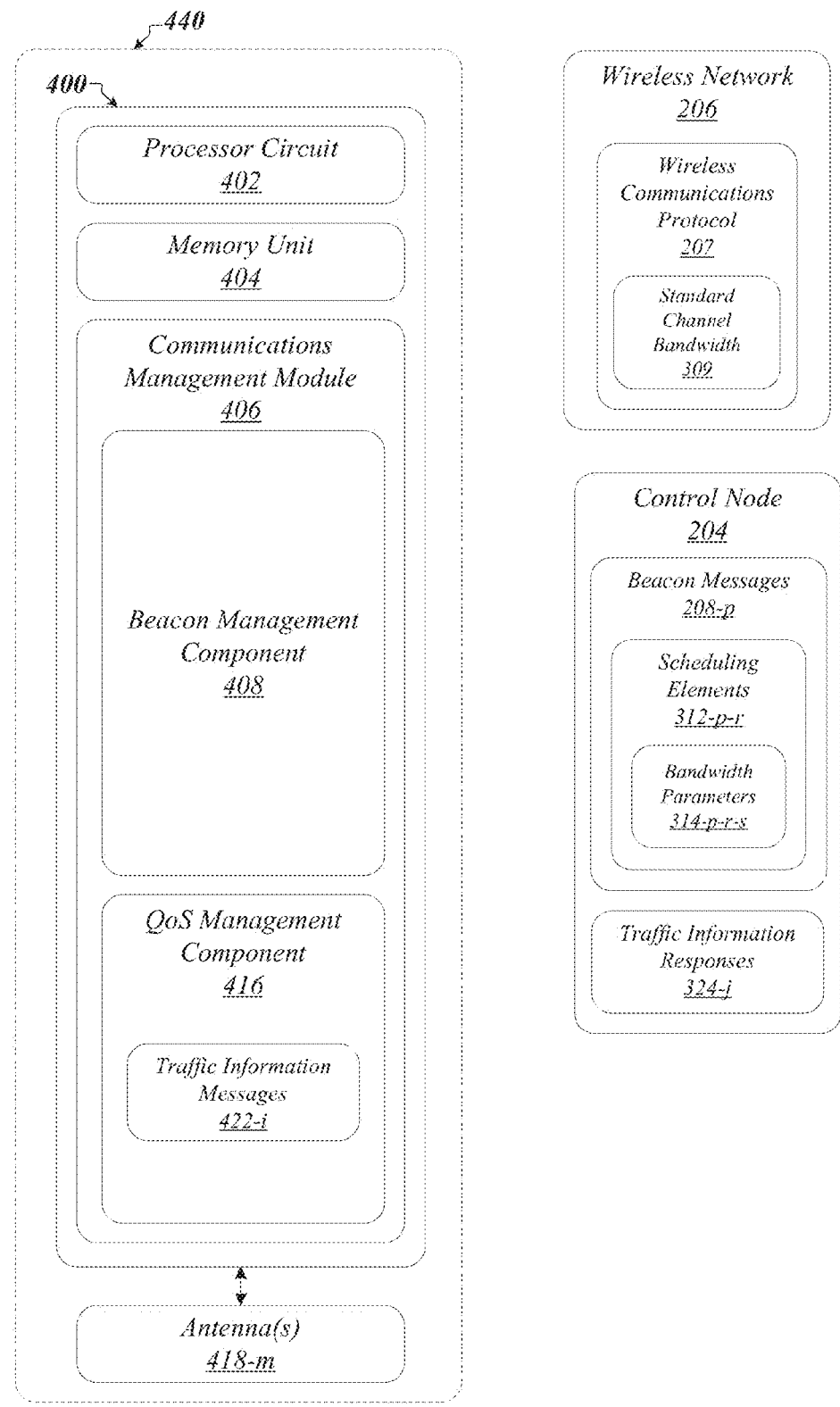
FIG. 4 illustrates one embodiment of a second apparatus and one embodiment of a second system.

FIG. 4 illustrates an apparatus 400 such as may comprise an example of a communications device 202-n of FIG. 2 according to various embodiments. As shown in FIG. 4, apparatus 400 comprises multiple elements including a processor circuit 402, a memory unit 404, and a communications management module 406. The embodiments, however, are not limited to the type, number, or arrangement of elements shown in this figure.

In various embodiments, apparatus 400 may comprise processor circuit 402. Processor circuit 402 may be implemented using any processor or logic device, and may be the same as or similar to processor circuit 302 of FIG. 3. The embodiments are not limited in this context.

In some embodiments, apparatus 400 may comprise or be arranged to communicatively couple with a memory unit 404. Memory unit 404 may be implemented using any machine-readable or computer-readable media capable of storing data, including both volatile and non-volatile memory, and may be the same as or similar to memory unit 304 of FIG. 3. The embodiments are not limited in this context.

In some embodiments, apparatus 400 may comprise communications management module 406. Communications management module 406 may comprise logic, circuitry, or instructions operative to manage communications of apparatus 400 over wireless network 206. In various embodiments, communications management module 406 may comprise logic, circuitry, or instructions operative to manage communications of apparatus 400 over wireless network 206 based on information received from a control node 204. The embodiments are not limited in this context.

FIG. 4 also illustrates a block diagram of a system 440. System 440 may comprise any of the aforementioned elements of apparatus 400. System 440 may further comprise one or more antennas 418-m. Antennas 418-m may comprise an antenna array in some embodiments. In various embodiments, apparatus 400 may be operative to transmit one or more messages over wireless network 206 using antennas 418-m. In some embodiments, apparatus 400 may be operative to perform one or more beamforming operations in conjunction with using antennas 418-m to transmit one or more messages over wireless network 206. The embodiments are not limited in this respect.

In general operation, apparatus 400 and/or system 440 may be operative to communicate over wireless network 206 according to variable channel bandwidths. In various embodiments, communications management module 406 may comprise beacon management component 408. Beacon management component 408 may comprise logic, circuitry, or instructions operative to process one or more received beacon messages 208-p according to the wireless communications protocol 207 for the wireless network 206. In some embodiments, communications management module 406 may be operative on antennas 418-m to receive the one or more beacon messages 208-p from control node 204 over wireless network 206. The embodiments are not limited in this context.

In various embodiments, beacon management component 408 may be operative to process received beacon messages 208-p comprising scheduling elements 312-p-r in order to determine one or more access periods and/or sub-periods defined for beacon intervals corresponding to those beacon messages 208-p. In some embodiments, those scheduling elements 312-p-r may comprise bandwidth parameters 314-p-r-s, and beacon management component 408 may be operative to process the bandwidth parameters 314-p-r-s to determine channel bandwidths for communications conducted by apparatus 400 and/or system 440 during the one or more access periods and/or sub-periods defined in the beacon messages 208-p. In various embodiments, once beacon management component 408 has determined a particular channel bandwidth to be used for communication over a channel of wireless network 206 during a particular access period or sub-period, apparatus 400 and/or system 440 may be operative to communicate over wireless network 206 according to the determined channel bandwidth during the particular access period or sub-period. The embodiments are not limited in this context.

In some embodiments, apparatus 400 and/or system 440 may comprise QoS component 416. In various embodiments, QoS component 416 may be operative to generate traffic information messages 422-*i*. In some embodiments, traffic information messages 422-*i* may comprise information describing characteristics of communications being performed by apparatus 400 and/or system 440 over wireless network 206, such as channel bandwidths of communications by apparatus 400 and/or system 440 over wireless network 206. In various embodiments, traffic information messages 322-*n-i* may comprise bandwidth parameters 314-*p-r-s* that indicate one or more channel bandwidths being used for communications by the apparatus 400 and/or system 440. In some embodiments, apparatus 400 and/or system 440 may be operative to communicate according to a particular channel bandwidth defined by a bandwidth parameter 314-*p-r-s* received in a beacon message 208-*p*, and QoS management component 416 may be operative to generate a traffic information message 322-*n-i* comprising a bandwidth parameter 314-*p-r-s* that matches that received in the beacon message 208-*p*. In various 802.11ad embodiments, traffic information messages 322-*n-i* may comprise add traffic stream (ADDTS) request messages. The embodiments are not limited in this context.

FIG. 5A illustrates a beacon message 500 such as may comprise an example of a beacon message 208-*p* of FIG. 2 in some embodiments. As shown in FIG. 5A, beacon message 500 comprises multiple sections, including a header 502, a body 504, and a validation value 510. In various embodiments, beacon message 500 may comprise a frame, and these sections within beacon message 500 may comprise fields within that frame. In some embodiments, header 502 may comprise parameters describing the format of beacon message 500, such that recipients of beacon message 500 may successfully parse the contents thereof to determine the information comprised within the various sections of beacon message 500. In various embodiments, validation value 510 may comprise an error correction value such as a checksum calculated for beacon message 500, and may be used by recipients to verify that they have correctly received beacon message 500. In some embodiments, body 504 may comprise information 505 and scheduling elements 506-1, 506-2, 506-3, and 506-4. Information 505 may comprise any type of information and/or data, and is included simply to illustrate that body 504 may not be comprised entirely of scheduling elements 506-1, 506-2, 506-3, and 506-4. Each of scheduling elements 506-1, 506-2, 506-3, and 506-4 comprises one or more bandwidth parameters. For example, scheduling element 506-1 comprises bandwidth parameter 508-1-1, while scheduling element 506-2 comprises bandwidth parameters 508-2-1 and 508-2-2. Each of scheduling elements 506-1, 506-2, 506-3, and 506-4 also comprises respective information 510-1, 510-2, 510-3, and 510-4, which may comprise any type of information and/or data, and is included simply to illustrate that scheduling elements 506-1, 506-2, 506-3, and 506-4 may not be comprised entirely of their respective bandwidth parameters. The embodiments are not limited in this context.

FIG. 5B illustrates an example of a beacon interval structure 520 such as may be defined by beacon message 500 of FIG. 5A according to various embodiments. As shown in FIG. 5B, beacon interval 522 comprises access periods 522-1, 522-2, 522-3, and 522-4. Each of these access periods may be defined by a corresponding scheduling element in beacon message 500 of FIG. 5A. For example, access period 522-1 may be defined by scheduling element 506-1 of FIG. 5A. Access period 522-2 comprises sub-periods 522-2-1 and 522-2-2, which may be defined by scheduling element 506-2 of FIG. 5A. Beacon interval 522 concludes at the end of access period 522-4, at which point a beacon interval 524 begins with an access period 524-1. The embodiments are not limited in this context.

FIG. 5C illustrates an example of a channel bandwidth schedule 540 such as may be defined for beacon interval structure 520 of FIG. 5B by bandwidth parameters 508-*r-s* of FIG. 5A according to some embodiments. As shown in FIG. 5C, for each access period defined by a scheduling element of FIG. 5A, a channel bandwidth is indicated for that access period by a bandwidth parameter comprised within that scheduling element. For example, scheduling element 506-1 of FIG. 1 may define access period 522-1, and the bandwidth parameter 508-1-1 that it comprises may indicate a channel bandwidth of 40 MHz. As such, the channel bandwidth for access period 522-1 within beacon interval 522 of FIG. 5B may be determined to be 40 MHz. The embodiments are not limited to this example.

FIG. 6A illustrates a DMG Beacon frame 600 such as may comprise an example of a beacon message 208-*p* of FIG. 2 in various 802.11ad embodiments. As shown in FIG. 6A, DMG Beacon Frame 600 comprises a MAC Header field 602, a Body 604, and a Frame Check Sequence field 618. MAC Header field 602 and Frame Check Sequence field 618 may comprise such fields as specified according to the WiGig/802.11ad Standards. In some embodiments, body 604 may comprise elements 605-*t* and Extended Schedule element 606. Elements 605-*t* may comprise any elements specified for inclusion in a DMG Beacon frame according to the WiGig/802.11ad Standards. In various embodiments, Extended Schedule element 606 may comprise an element ID 608, a length 609, and allocations 610-*n*. In some embodiments, Element ID 608 may comprise an identification value for Extended Schedule element 606. In various embodiments, Length 609 may comprise a value indicating a combined length of allocations 610-*n*. In some embodiments, each of allocations 610-*n* may comprise a respective bandwidth parameter 612-*n* and respective information 614-*n*. In various embodiments, information 614-*n* may comprise any information and/or data specified for inclusion in an Allocation field within an Extended Schedule element according to the WiGig/802.11ad Standards. In some embodiments, each allocation 610-*n* may define an access period or sub-period for a beacon interval of a WiGig/802.11ad wireless network. In various embodiments, the bandwidth parameters 612-*n* within allocations 610-*n* may indicate channel bandwidths for the access periods and/or sub-periods defined by those allocations 610-*n*. It is worthy of note that although FIG. 6A illustrates a DMG Beacon frame as an example of a beacon message 208-*p* of FIG. 2, beacon messages 208-*p* may comprise one or more 802.11ad Announce frames in various 802.11ad embodiments, and embodiments are not limited in this context.

FIG. 6B illustrates an example of a beacon interval structure 620 such as may be defined by beacon message 600 of FIG. 6A according to some 802.11ad embodiments. As shown in FIG. 6B, beacon interval 622 comprises BTI 623, A-BFT Interval 625, ATI 627, and DTI 629. DTI 629 comprises four sub-periods: SP 1, CBAP 1, CBAP 2, and SP 2. Each of these access periods and sub-periods may be defined by a corresponding allocation 610-*n* in DMG Beacon Frame 600 of FIG. 6A. For example, allocation 610-1 of FIG. 6A may define BTI 623, while allocations 610-4, 610-5, 610-6, and 610-7 of FIG. 6A may define SP 1, CBAP 1, CBAP 2, and SP 2, respectively. Beacon interval 622 concludes at the end of DTI 629, at which point a beacon interval 632 begins with a BTI 633. The embodiments are not limited in this context.

FIG. 6C illustrates an example of a channel bandwidth schedule 640 such as may be defined for beacon interval structure 620 of FIG. 6B by bandwidth parameters 612-$r$ of FIG. 6A according to various 802.11ad embodiments. As shown in FIG. 6C, for each access period or sub-period defined by an allocation of FIG. 6A, a channel bandwidth is indicated for that access period or sub-period by a bandwidth parameter comprised within that allocation. For example, allocations 610-4, 610-5, 610-6, and 610-7 of FIG. 6A may define SP 1, CBAP 1, CBAP 2, and SP 2, respectively, and may comprise bandwidth parameters 612-4, 612-5, 612-6, and 612-7 indicating various multiples or fractions of a standard channel bandwidth CH_BW for the 802.11ad wireless network. In the example of FIG. 6C, the channel bandwidths for SP 1, CBAP 1, CBAP 2, and SP 2 within DTI 629 are indicated to be CH_BW*2, CH_BW/2, CH_BW, and CH_BW*3. With respect to FIG. 6A, this corresponds to an example embodiment in which bandwidth parameter 612-4 indicates a bandwidth of CH_BW*2, bandwidth parameter 612-5 indicates a bandwidth of CH_BW/2, bandwidth parameter 612-6 indicates a bandwidth of CH_BW, and bandwidth parameter 612-7 indicates a bandwidth of CH_BW*3. The embodiments are not limited to this example.

Figure 7:
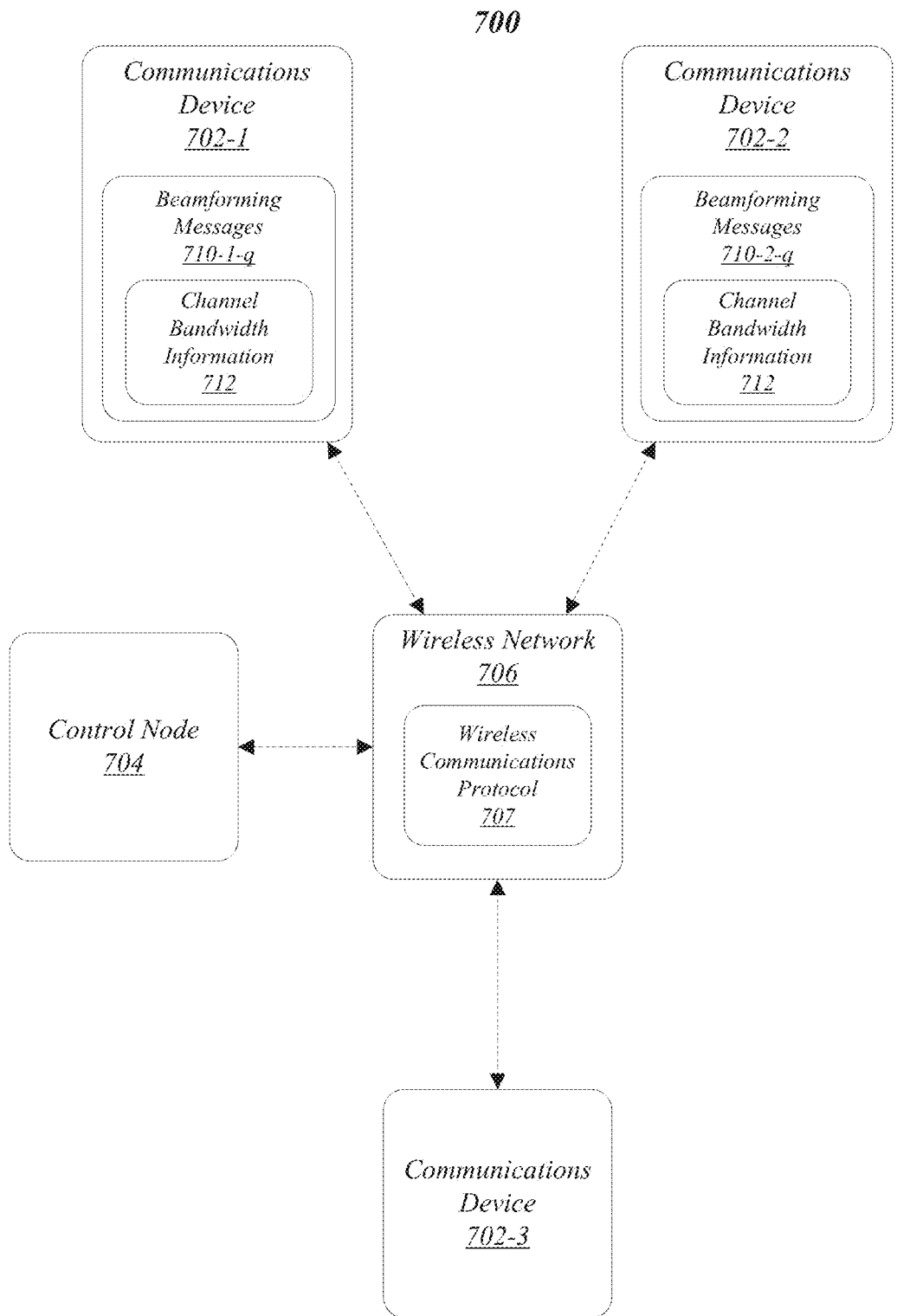
FIG. 7 illustrates one embodiment of a third communications environment.

FIG. 7 illustrates an embodiment of a variable channel bandwidth communications system 700 according to some embodiments. As shown in FIG. 7, communications devices 702-1, 702-2, and 702-3 and control node 704 communicate over a wireless network 706. In various embodiments, wireless network 706 may comprise a 60 GHz multi-gigabit wireless network. For example, in some embodiments, wireless network 706 may comprise a WiGig/802.11ad wireless network. In various embodiments, wireless network 706 may be implemented according to a wireless communications protocol 707 that enables the implementation of variable channel bandwidths for communications channels of wireless network 706. For example, in some 802.11ad embodiments in which wireless network 706 comprises a WiGig/802.11ad wireless network, wireless communications protocol 707 may comprise modifications of the WiGig/802.11ad Standards that enable the implementation of variable channel bandwidths for communications channels of WiGig/802.11ad wireless networks. The embodiments are not limited in this context.

In various embodiments, some or all of communications devices 702-$n$ may be operative to perform beamforming operations in conjunction with their communications over wireless network 706. In some embodiments, some or all of communications devices 702-$n$ may be operative to transmit and/or receive one or more beamforming messages 710-$n$-$q$ in conjunction with such beamforming operations. For example, in various embodiments, communications device 702-1 may transmit one or more beamforming messages 710-1-$q$ to communications device 702-2, receive one or more beamforming messages 710-2-$q$ from communications device 702-2 in response, and determine beamforming parameters for a subsequent transmission to communications device 702-2 based on this exchange of beamforming messages. In some embodiments, any particular pair of communications devices 702-$n$ may exchange one or more beamforming messages 710-$n$-$q$ in order to determine beamforming parameters for communication with each other over a channel of wireless network 706.

In various embodiments, wireless communications protocol 707 may enable the implementation of variable channel bandwidths for communications channels of wireless network 706 by accommodating the inclusion of channel bandwidth information 712 in beamforming messages 710-$n$-$q$. In some embodiments, communications devices 702-$n$ may communicate over communications channels of wireless network 706 according to channel bandwidth information 712 in one or more beamforming messages 710-$n$-$q$ that they send and/or receive. In various embodiments, wireless communications protocol 707 may comprise an updated and/or modified version of a previous protocol. In some embodiments, some communications devices 702-$n$ may operate according to the previous protocol rather than according to wireless communications protocol 707. In various embodiments, wireless communications protocol 707 may specify a structure for beamforming messages 710-$n$-$q$ such that communications devices 702-$n$ that operate according to the previous protocol and cannot process channel bandwidth information 712 within beamforming messages 710-$n$-$q$ are still able to process the remaining contents of beamforming messages 710-$n$-$q$ and are thus still able to perform beamforming operations in conjunction with communication over wireless network 706. As such, wireless communications protocol 707 may support variable channel bandwidths while maintaining backwards compatibility for devices operating according to the previous protocol. The embodiments are not limited in this context.

Figure 8:
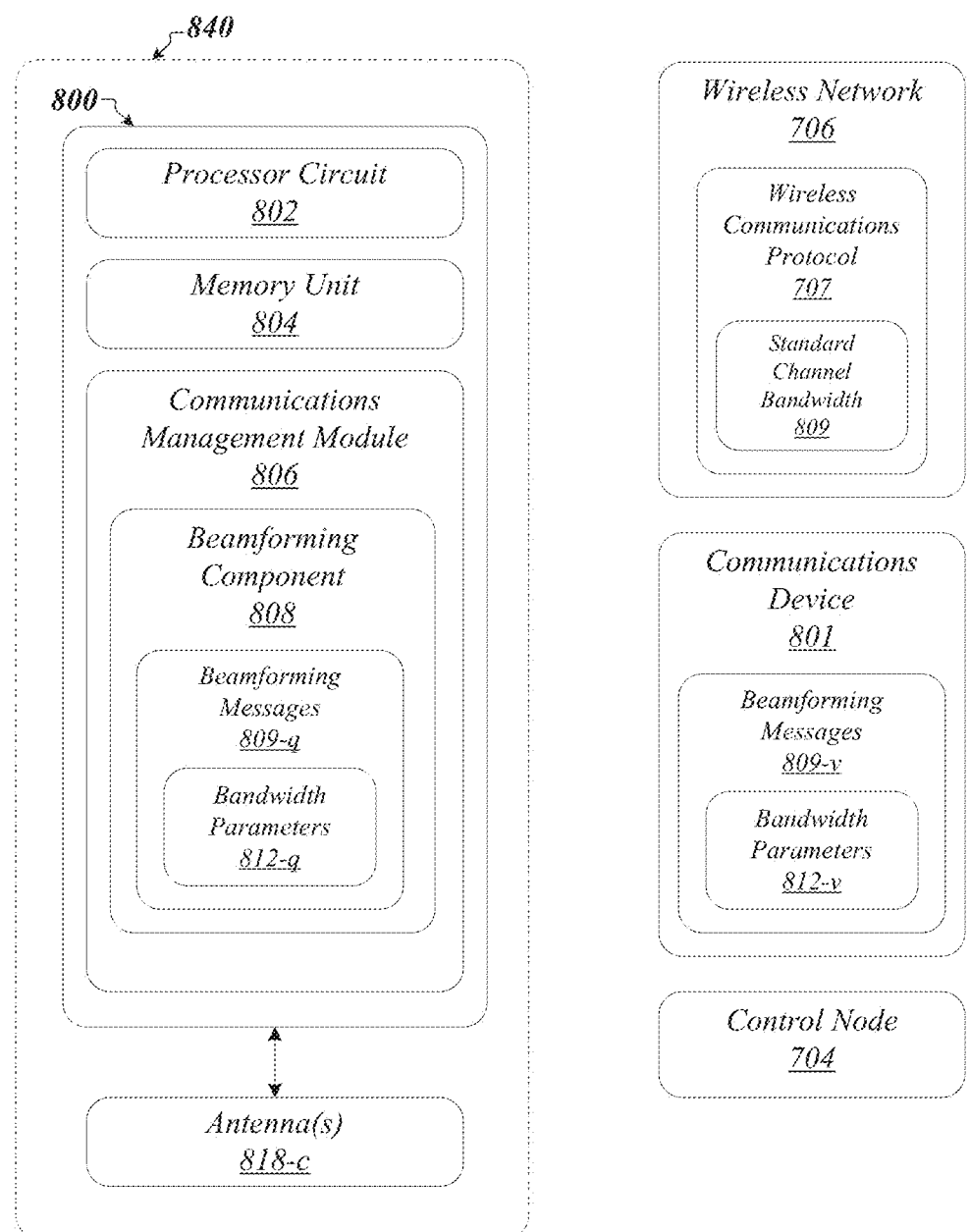
FIG. 8 illustrates one embodiment of a third apparatus and one embodiment of a third system.

FIG. 8 illustrates an apparatus 800 such as may comprise an example of a communications device 702-$n$ of FIG. 7 according to some embodiments. As shown in FIG. 8, apparatus 800 comprises multiple elements including a processor circuit 802, a memory unit 804, and a communications management module 806. The embodiments, however, are not limited to the type, number, or arrangement of elements shown in this figure.

In various embodiments, apparatus 800 may comprise processor circuit 802. Processor circuit 802 may be implemented using any processor or logic device, and may be the same as or similar to processor circuit 302 of FIG. 3. The embodiments are not limited in this context.

In some embodiments, apparatus 800 may comprise or be arranged to communicatively couple with a memory unit 804. Memory unit 804 may be implemented using any machine-readable or computer-readable media capable of storing data, including both volatile and non-volatile memory, and may be the same as or similar to memory unit 304 of FIG. 3. The embodiments are not limited in this context.

In various embodiments, apparatus 800 may comprise communications management module 806. Communications management module 806 may comprise logic, circuitry, or instructions operative to manage communications of apparatus 800 over a wireless network 706. In some embodiments, wireless network 706 may comprise a WiGig/802.11ad wireless network. In various embodiments, communications management module 806 may comprise logic, circuitry, or instructions operative to manage communications of apparatus 800 over wireless network 706 based on information received from a control node 704 and/or on information received from a communications device 801. The embodiments are not limited in this context.

FIG. 8 also illustrates a block diagram of a system 840. System 840 may comprise any of the aforementioned elements of apparatus 800. System 840 may further comprise one or more antennas 818-c. Antennas 818-c may comprise an antenna array in some embodiments. In various embodiments, apparatus 800 may be operative to transmit one or more messages over wireless network 706 using antennas 818-c. In some embodiments, apparatus 800 may be operative to perform one or more beamforming operations in conjunction with using antennas 818-c to transmit one or more messages over wireless network 706. The embodiments are not limited in this respect.

In general operation, apparatus 800 and/or system 840 may be operative to communicate over wireless network 706 according to variable channel bandwidths. In various embodiments, apparatus 800 and/or system 840 may be operative to communicate with a communications device 801 over wireless network 706. In some 802.11ad embodiments, apparatus 800 and/or system 840 may comprise a STA, and communications device 801 may comprise another STA. In various embodiments, apparatus 800 and/or system 840 may be operative to perform beamforming operations in cooperation with communications device 801 in order to facilitate their communication with each other over wireless network 706. The embodiments are not limited in this context.

In some embodiments, communications management module 806 may comprise beamforming component 808. Beamforming component 808 may be operative in various embodiments to generate one or more beamforming messages 809-$q$. In some embodiments, any particular beamforming message 809-$q$ may comprise one or more bandwidth parameters 812-$q$. In various embodiments, a bandwidth parameter 812-$q$ within a particular beamforming message 809-$q$ that is used to determine beamforming parameters for communication between apparatus 800 and/or system 840 and communications device 801 over a channel of wireless network 706 may indicate a channel bandwidth for that channel. In some embodiments, apparatus 800 and/or system 840 and communications device 801 may utilize an exchange of beamforming messages 809-$q$ and 809-$v$, respectively, that comprise bandwidth parameters 812-$q$ to negotiate a channel bandwidth for subsequent communication with each other over a channel of wireless network 706. In various embodiments, beamforming component 808 may be operative to generate a beamforming message 809-$q$ comprising a beamforming initiation message. Such a beamforming initiation message may comprise a message indicating to communications device 801 that apparatus 800 and/or system 840 wishes to perform a beamforming training sequence with communications device 801. In some embodiments, communications device 801 may transmit a beamforming message 809-$v$ in response that comprises a beamforming initiation confirmation message. Such a beamforming initiation conformation message may indicate to apparatus 800 and/or system 840 that communications device 801 is willing to perform the beamforming training sequence. The embodiments are not limited in this context.

In various embodiments, based on receiving a beamforming message 809-$v$ that indicates that communications device 801 is willing to perform a beamforming training sequence with apparatus 800 and/or system 840, beamforming component 808 may be operative to generate additional beamforming messages 809-$q$ in order to perform the beamforming training sequence and determine one or more beamforming parameters based on the beamforming training sequence. Apparatus 800 and/or system 840 may then be operative to transmit one or more messages over a channel of wireless network 706 according to a channel bandwidth indicated by a bandwidth parameter 812-$q$ comprised within the beamforming initiation message and according to the one or more determined beamforming parameters. The embodiments are not limited in this context.

In some embodiments, wireless network 706 may operate according to a wireless communications protocol 707, and beamforming component 808 may be operative to generate bandwidth parameters 812-$q$ in compliance with a format specified by wireless communications protocol 707. In various embodiments, wireless communications protocol 707 may specify a standard channel bandwidth 809, and beamforming component 808 may be operative to generate one or more beamforming messages 809-$q$ comprising one or more bandwidth parameters 812-$q$ that indicate channel bandwidths that differ from the standard channel bandwidth 809. In some such embodiments, one or more of bandwidth parameters 812-$q$ may indicate channel bandwidths that comprise positive multiples of standard channel bandwidth 809 and/or positive fractions of standard channel bandwidth 809. In various embodiments, one or more of bandwidth parameters 812-$q$ may indicate channel bandwidths that comprise positive integer multiples of standard channel bandwidth 809. In an example embodiment, a particular bandwidth parameter 812-$q$ may indicate a channel bandwidth equal to the standard channel bandwidth 809 multiplied by 4. In some embodiments, one or more of bandwidth parameters 812-$q$ may indicate channel bandwidths that comprise proper common fractions of standard channel bandwidth 809. In an example embodiment, a particular bandwidth parameter 812-$q$ may indicate a channel bandwidth equal to the standard channel bandwidth 809 divided by 4. It is to be understood that in various embodiments, bandwidth parameters 812-$q$ may indicate non-integer multiples and/or fractions of standard channel bandwidth 809, and the embodiments are not limited in this context.

In some 802.11ad embodiments, wireless communications protocol 707 may comprise modifications of the WiGig/802.11ad Standards that enable the implementation of variable channel bandwidths. In various such 802.11ad embodiments, apparatus 800 and/or system 840 may comprise a STA, communications device 801 may comprise another STA, and both may be operative to transmit one or more beamforming messages 809-$q$ and 809-$v$, respectively, that comprise 802.11ad beamforming training frames. In some 802.11ad embodiments, such beamforming training frames may comprise SSW frames, SSW Feedback frames, SSW ACK frames, DMG Beacon frames, Grant frames, Grant ACK frames, and/or BRP frames. In various 802.11ad embodiments, a particular bandwidth parameter 812-$q$ or 812-$v$ within a particular beamforming training frame that is used to determine beamforming parameters for communication between two STAs over a channel of the WiGig/802.11ad wireless network may indicate a channel bandwidth for that channel. In some embodiments, the wireless communications protocol 707 may be fashioned to support the inclusion of bandwidth parameters in Grant frames transmitted by control node 704 and Grant ACK frames transmitted by apparatus 800 and/or system 840 in response to such Grant frames. In various embodiments, apparatus 800 and/or system 840 may be operative to determine one or more bandwidth parameters 812-$q$ based on bandwidth parameters comprised within Grant frames received from control node 704, to transmit Grant ACK frames comprising the one or more bandwidth parameters 812-$q$, and to transmit beamforming training frames comprising the one or more bandwidth parameters 812-$q$. The embodiments are not limited in this context.

In some embodiments, once apparatus 800 and/or system 840 and communications device 801 have exchanged beamforming messages 809-$q$ and 809-$v$, they may be operative to transmit information to each other over wireless network 706 according to one or more beamforming parameters determined based on the exchange of beamforming messages 809-$q$ and 809-$v$. In various embodiments, apparatus 800 and/or system 840 and communications device 801 may be operative to transmit information to each other over wireless network 706 according to a channel bandwidth negotiated through the exchange of beamforming messages 809-$q$ and 809-$v$, based on one or more bandwidth parameters 812-$q$ and/or 812-$v$ comprised within those beamforming messages 809-$q$ and 809-$v$. The embodiments are not limited in this context.

Figure 9:
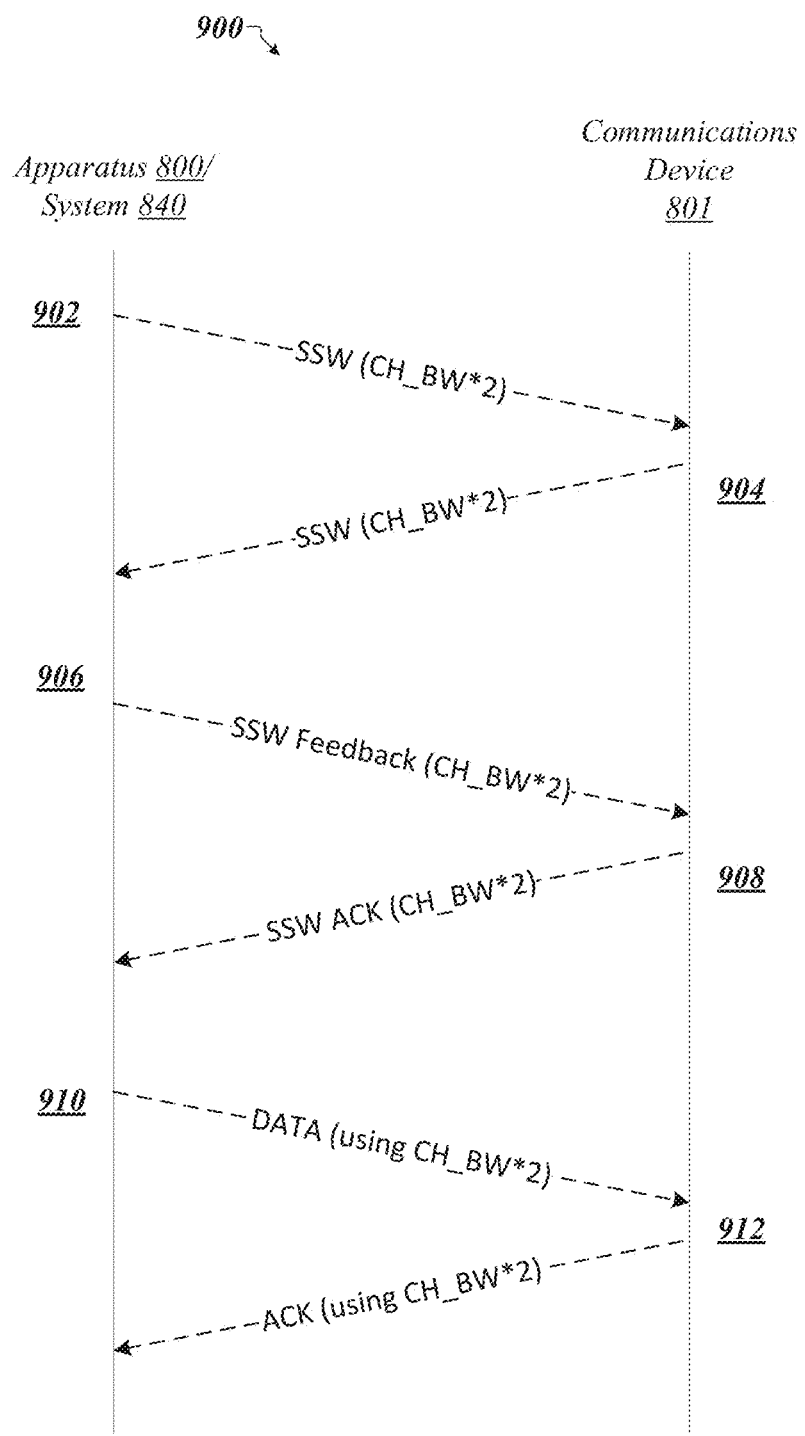
FIG. 9 illustrates one embodiment of a transmission diagram.

FIG. 9 illustrates a transmission diagram 900 such as may comprise an example of beamforming transmissions exchanged by apparatus 800 and/or system 840 and communications device 801 of FIG. 8 in some 802.11ad embodiments. At 902, apparatus 800 and/or system 840 may be operative to transmit an SSW frame to communications device 801, and the SSW frame may comprise a bandwidth parameter indicating a channel bandwidth of CH_BW*2, where CH_BW represents a standard channel bandwidth for an 802.11ad wireless network over which apparatus 800 and/or system 840 and communications device 801 communicate. At 904, communications device 801 may be operative to transmit a SSW frame to apparatus 800 and/or system 840 in response, which may also comprise a bandwidth parameter indicating the channel bandwidth of CH_BW*2. At 906, apparatus 800 and/or system 840 may be operative to transmit an SSW Feedback frame to communications device 801 which may also comprise a bandwidth parameter indicating the channel bandwidth of CH_BW*2. At 908, communications device 801 may be operative to transmit an SSW ACK frame to apparatus 800 and/or system 840 in response, which may also comprise a bandwidth parameter indicating the channel bandwidth of CH_BW*2. At 910, apparatus 800 and/or system 840 may be operative to transmit a DATA frame to communications device 801 using the channel bandwidth CH_BW*2. At 912, communications device 801 may be operative to transmit an ACK frame to apparatus 800 and/or system 840 in response, and may transmit the ACK frame using the channel bandwidth CH_BW*2. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 10:
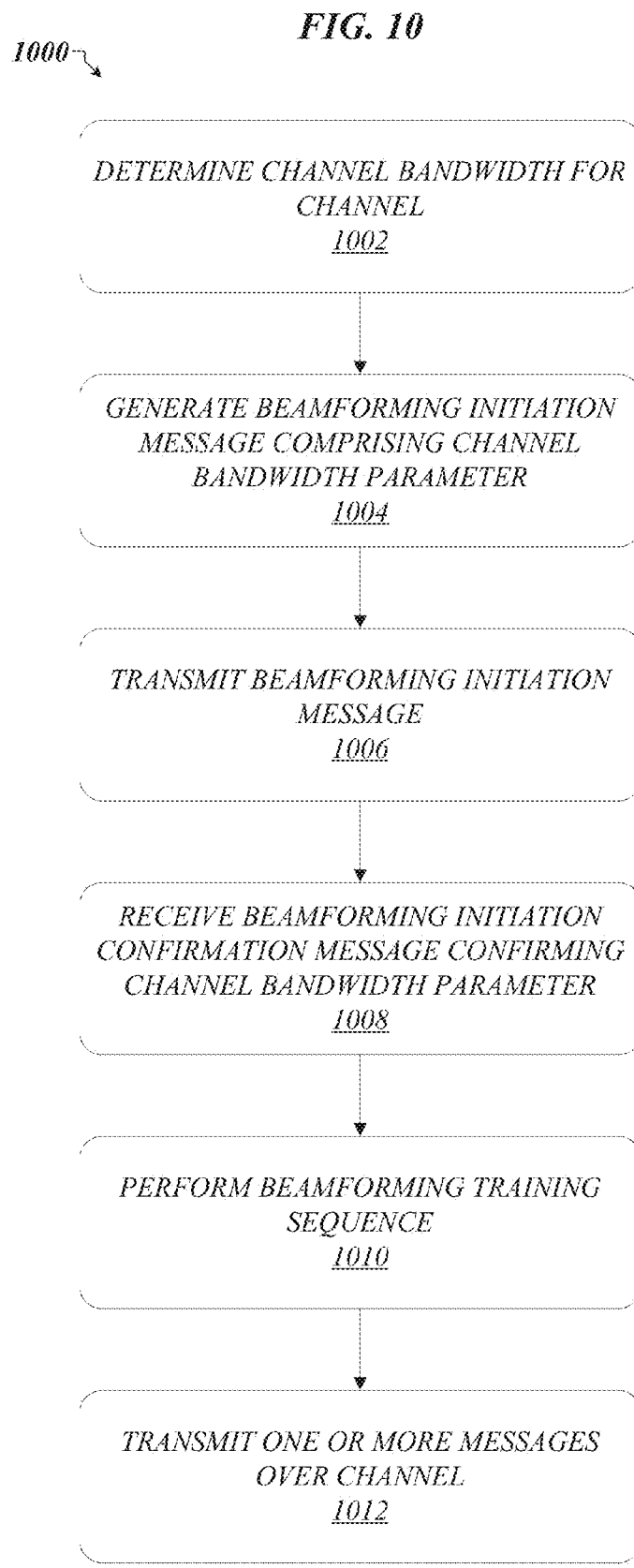
FIG. 10 illustrates one embodiment of a first logic flow.

FIG. 10 illustrates one embodiment of a logic flow 1000, which may be representative of the operations executed by one or more embodiments described herein. More particularly, logic flow 1000 may comprise an example of operations performed by apparatus 800 and/or system 840 of FIG. 8 in a variable channel bandwidth wireless network. As shown in logic flow 1000, at 1002, a channel bandwidth may be determined for a channel. For example, communications management module 806 of FIG. 8 may determine a channel bandwidth to be used for a channel of wireless network 706. At 1004, a beamforming initiation message may be generated that comprises a channel bandwidth parameter indicating the determined channel bandwidth. For example, beamforming component 808 of FIG. 8 may generate a beamforming message 809-$q$ comprising a beamforming initiation message, and the beamforming message 809-$q$ may comprise a bandwidth parameter 812-$q$ indicating the determined channel bandwidth. At 1006, the beamforming initiation message may be transmitted. For example, communications management module 806 of FIG. 8 may be operative on antennas 818-$c$ to transmit the beamforming initiation message to communications device 801.

At 1008, a beamforming initiation confirmation message may be received that confirms the channel bandwidth parameter. For example, communications management module 806 of FIG. 8 may be operative to receive a beamforming message 809-$v$ from communications device 801 that comprises a beamforming initiation confirmation message and confirms the bandwidth parameter 812-$q$. At 1010, a beamforming training sequence may be performed based on the exchange of the beamforming initiation message and the beamforming initiation confirmation message. For example, apparatus 800 and/or system 840 and communications device 801 of FIG. 8 may be operative to perform a beamforming training sequence based on the exchange of the beamforming initiation message and the beamforming initiation confirmation message. At 1012, one or more messages may be transmitted over the channel based on the channel bandwidth parameter and on one or more beamforming parameters determined according to the beamforming training sequence. For example, communications management module 806 of FIG. 8 may be operative on antennas 818-$c$ to transmit one or more messages to communications device 801 over the channel of wireless network 706 based on the bandwidth parameter 812-$q$ and on one or more beamforming parameters determined according to the beamforming training sequence. The embodiments are not limited to these examples.

Figure 11:
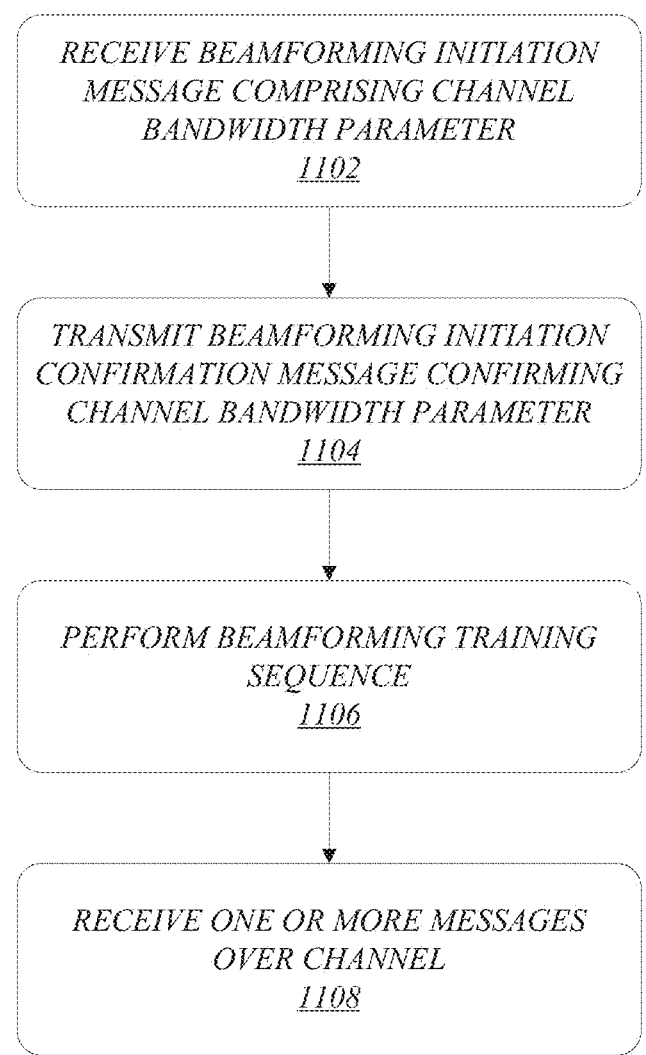
FIG. 11 illustrates one embodiment of a second logic flow.

FIG. 11 illustrates one embodiment of a logic flow 1100, which may be representative of the operations executed by one or more embodiments described herein. More particularly, logic flow 1100 may comprise an example of operations performed by communications device 801 of FIG. 8 in a variable channel bandwidth wireless network. As shown in logic flow 1100, at 1102, a beamforming initiation message may be received that comprises a channel bandwidth parameter. For example, communications device 801 of FIG. 8 may be operative to receive a beamforming message 809-$q$ from apparatus 800 and/or system 840 comprising a beamforming initiation message, and the beamforming message 809-$q$ may comprise a bandwidth parameter 812-$q$ indicating a determined channel bandwidth. At 1104, a beamforming initiation confirmation message may be transmitted that confirms the channel bandwidth parameter. For example, communications device 801 of FIG. 8 may be operative to transmit a beamforming message 809-$v$ that comprises a beamforming initiation confirmation message and confirms the bandwidth parameter 812-$q$.

At 1106, a beamforming training sequence may be performed based on the exchange of the beamforming initiation message and the beamforming initiation confirmation message. For example, apparatus 800 and/or system 840 and communications device 801 of FIG. 8 may be operative to perform a beamforming training sequence based on the exchange of the beamforming initiation message and the beamforming initiation confirmation message. At 1108, one or more messages may be received over the channel that were transmitted based on the channel bandwidth parameter and on one or more beamforming parameters determined according to the beamforming training sequence. For example, communications device 801 of FIG. 8 may be operative to receive one or more messages from apparatus 800 and/or system 840 over the channel of wireless network 706 based on the bandwidth parameter 812-$q$ and on one or more beamforming parameters determined according to the beamforming training sequence. The embodiments are not limited to these examples.

FIG. 12 illustrates one embodiment of a logic flow 1200, which may be representative of the operations executed by one or more embodiments described herein. More particularly, logic flow 1200 may comprise an example of operations performed by apparatus 300 and/or system 340 of FIG. 3 in implementation of a variable channel bandwidth wireless network. As shown in logic flow 1200, at 1202, a channel bandwidth for a channel during an access period within a beacon interval may be determined. For example, beacon management component 308 of FIG. 3 may be operative to determine a channel bandwidth for a channel during an access period within a beacon interval of wireless network 206. At 1204, a beacon message may be generated that comprises a scheduling element that defines the access period and a channel bandwidth parameter that indicates the channel bandwidth. For example, beacon management component 308 of FIG. 3 may be operative to generate a beacon message 208-$p$ comprising a scheduling element 312-$p$-$r$ that defines the access period, and the scheduling element 312-$p$-$r$ may comprise a bandwidth parameter 314-$p$-$r$-$s$ that indicates the determined channel bandwidth. At 1206, the beacon message may be transmitted. For example, communications management module 306 of FIG. 3 may be operative on antennas 318-$k$ to transmit the beacon message 208-$p$ to one or more communications devices 202-$n$. The embodiments are not limited to these examples.

FIG. 13 illustrates one embodiment of a logic flow 1300, which may be representative of the operations executed by one or more embodiments described herein. More particularly, logic flow 1300 may comprise an example of operations performed by apparatus 400 and/or system 440 of FIG. 4 in a variable channel bandwidth wireless network. As shown in logic flow 1300, at 1302, a beacon message may be received that comprises a scheduling element that defines an access period and a channel bandwidth parameter that indicates a channel bandwidth. For example, communications management module 406 of FIG. 4 may be operative to receive a beacon message 208-$p$ from control node 204 that comprises a scheduling element 312-$p$-$r$ that defines an access period for wireless network 206 and a bandwidth parameter 314-$p$-$r$-$s$. At 1304, a channel bandwidth for the channel during the access period may be determined based on the channel bandwidth parameter in the beacon message. For example, communications management module 406 of FIG. 4 may be operative to determine a channel bandwidth for the access period based on the bandwidth parameter 314-$p$-$r$-$s$. At 1306, one or more messages may be transmitted over the channel during the access period based on the channel bandwidth. For example, communications management module 406 of FIG. 4 may be operative on antennas 418-$m$ to transmit one or more messages over the channel of wireless network 206 during the access period based on the channel bandwidth indicated by the bandwidth parameter 314-$p$-$r$-$s$. The embodiments are not limited to these examples.

Figure 14:
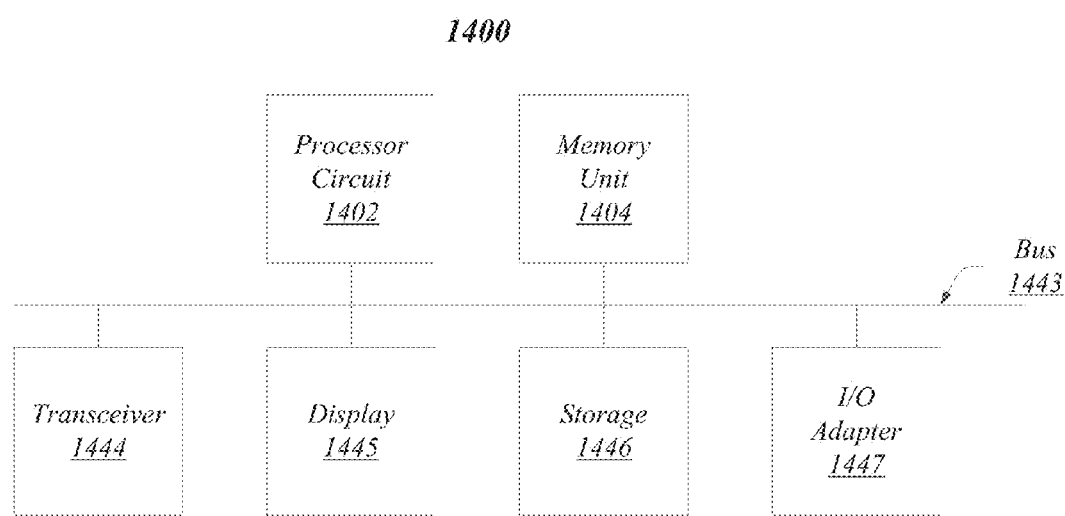
FIG. 14 illustrates one embodiment of a fourth system.

FIG. 14 illustrates one embodiment of a system 1400. In various embodiments, system 1400 may be representative of a system or architecture suitable for use with one or more embodiments described herein, such as apparatus 300 and/or system 340 of FIG. 3, apparatus 400 and/or system 440 of FIG. 4, apparatus 800 and/or system 840 of FIG. 8, logic flow 1000 of FIG. 10, logic flow 1100 of FIG. 11, logic flow 1200 of FIG. 12, and/or logic flow 1300 of FIG. 13. The embodiments are not limited in this respect.

As shown in FIG. 14, system 1400 may include multiple elements. One or more elements may be implemented using one or more circuits, components, registers, processors, software subroutines, modules, or any combination thereof, as desired for a given set of design or performance constraints. Although FIG. 14 shows a limited number of elements in a certain topology by way of example, it can be appreciated that more or less elements in any suitable topology may be used in system 1400 as desired for a given implementation. The embodiments are not limited in this context.

In various embodiments, system 1400 may include a processor circuit 1402. Processor circuit 1402 may be implemented using any processor or logic device, and may be the same as or similar to processor circuit 302 of FIG. 3, processor circuit 402 of FIG. 4, and/or processor circuit 802 of FIG. 8.

In one embodiment, system 1400 may include a memory unit 1404 to couple to processor circuit 1402. Memory unit 1404 may be coupled to processor circuit 1402 via communications bus 1443, or by a dedicated communications bus between processor circuit 1402 and memory unit 1404, as desired for a given implementation. Memory unit 1404 may be implemented using any machine-readable or computer-readable media capable of storing data, including both volatile and non-volatile memory, and may be the same as or similar to memory unit 304 of FIG. 3, memory unit 404 of FIG. 4, and/or memory unit 804 of FIG. 8. In some embodiments, the machine-readable or computer-readable medium may include a non-transitory medium. The embodiments are not limited in this context.

In various embodiments, system 1400 may include a transceiver 1444. Transceiver 1444 may include one or more radios capable of transmitting and receiving signals using various suitable wireless communications techniques. Such techniques may involve communications across one or more wireless networks. In communicating across such networks, transceiver 1444 may operate in accordance with one or more applicable standards in any version. The embodiments are not limited in this context.

In various embodiments, system 1400 may include a display 1445. Display 1445 may constitute any display device capable of displaying information received from processor circuit 1402. Examples for display 1445 may include a television, a monitor, a projector, and a computer screen. In one embodiment, for example, display 1445 may be implemented by a liquid crystal display (LCD), light emitting diode (LED) or other type of suitable visual interface. Display 1445 may comprise, for example, a touch-sensitive color display screen. In various implementations, display 1445 may comprise one or more thin-film transistors (TFT) LCD including embedded transistors. The embodiments are not limited in this context.

In various embodiments, system 1400 may include storage 1446. Storage 1446 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1446 may include technology to increase the storage performance enhanced protection for valuable digital media when multiple hard drives are included, for example. Further examples of storage 1446 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1400 may include one or more I/O adapters 1447. Examples of I/O adapters 1447 may include Universal Serial Bus (USB) ports/adapters, IEEE 1394 Firewire ports/adapters, and so forth. The embodiments are not limited in this context.

Figure 15:
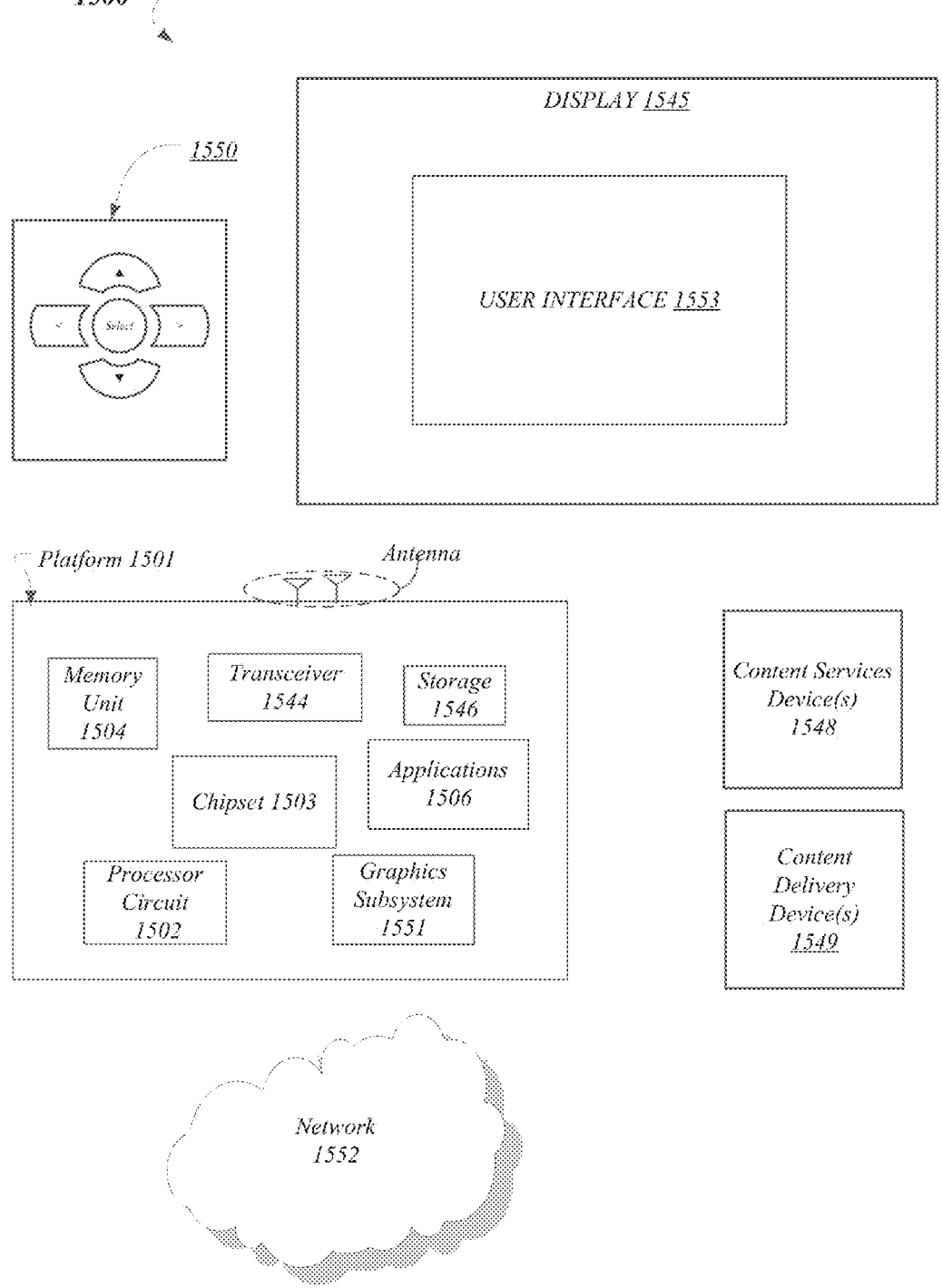
FIG. 15 illustrates one embodiment of a fifth system.

FIG. 15 illustrates an embodiment of a system 1500. In various embodiments, system 1500 may be representative of a system or architecture suitable for use with one or more embodiments described herein, such as apparatus 300 and/or system 340 of FIG. 3, apparatus 400 and/or system 440 of FIG. 4, apparatus 800 and/or system 840 of FIG. 8, logic flow 1000 of FIG. 10, logic flow 1100 of FIG. 11, logic flow 1200 of FIG. 12, logic flow 1300 of FIG. 13, and/or system 1400 of FIG. 14. The embodiments are not limited in this respect.

As shown in FIG. 15, system 1500 may include multiple elements. One or more elements may be implemented using one or more circuits, components, registers, processors, software subroutines, modules, or any combination thereof, as desired for a given set of design or performance constraints. Although FIG. 15 shows a limited number of elements in a certain topology by way of example, it can be appreciated that more or less elements in any suitable topology may be used in system 1500 as desired for a given implementation. The embodiments are not limited in this context.

In embodiments, system 1500 may be a media system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1500 includes a platform 1501 coupled to a display 1545. Platform 1501 may receive content from a content device such as content services device(s) 1548 or content delivery device(s) 1549 or other similar content sources. A navigation controller 1550 including one or more navigation features may be used to interact with, for example, platform 1501 and/or display 1545. Each of these components is described in more detail below.

In embodiments, platform 1501 may include any combination of a processor circuit 1502, chipset 1503, memory unit 1504, transceiver 1544, storage 1546, applications 1506, and/or graphics subsystem 1551. Chipset 1503 may provide intercommunication among processor circuit 1502, memory unit 1504, transceiver 1544, storage 1546, applications 1506, and/or graphics subsystem 1551. For example, chipset 1503 may include a storage adapter (not depicted) capable of providing intercommunication with storage 1546.

Processor circuit 1502 may be implemented using any processor or logic device, and may be the same as or similar to processor circuit 1402 in FIG. 14.

Memory unit 1504 may be implemented using any machine-readable or computer-readable media capable of storing data, and may be the same as or similar to memory unit 1404 in FIG. 14.

Transceiver 1544 may include one or more radios capable of transmitting and receiving signals using various suitable wireless communications techniques, and may be the same as or similar to transceiver 1444 in FIG. 14.

Display 1545 may include any television type monitor or display, and may be the same as or similar to display 1445 in FIG. 14.

Storage 1546 may be implemented as a non-volatile storage device, and may be the same as or similar to storage 1446 in FIG. 14.

Graphics subsystem 1551 may perform processing of images such as still or video for display. Graphics subsystem 1551 may be a graphics processing unit (GPU) or a visual processing unit (VPU), for example. An analog or digital interface may be used to communicatively couple graphics subsystem 1551 and display 1545. For example, the interface may be any of a High-Definition Multimedia Interface, DisplayPort, wireless DisplayPort, Miracast, wireless HDMI, and/or wireless HD compliant techniques. Graphics subsystem 1551 could be integrated into processor circuit 1502 or chipset 1503. Graphics subsystem 1551 could be a stand-alone card communicatively coupled to chipset 1503.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1548 may be hosted by any national, international and/or independent service and thus accessible to platform 1501 via the Internet, for example. Content services device(s) 1548 may be coupled to platform 1501 and/or to display 1545. Platform 1501 and/or content services device(s) 1548 may be coupled to a network 1552 to communicate (e.g., send and/or receive) media information to and from network 1552. Content delivery device(s) 1549 also may be coupled to platform 1501 and/or to display 1545.

In embodiments, content services device(s) 1548 may include a cable television box, personal computer, network, telephone, Internet enabled devices or appliance capable of delivering digital information and/or content, and any other similar device capable of unidirectionally or bidirectionally communicating content between content providers and platform 1501 and/display 1545, via network 1552 or directly. It will be appreciated that the content may be communicated unidirectionally and/or bidirectionally to and from any one of the components in system 1500 and a content provider via network 1552. Examples of content may include any media information including, for example, video, music, medical and gaming information, and so forth.

Content services device(s) 1548 receives content such as cable television programming including media information, digital information, and/or other content. Examples of content providers may include any cable or satellite television or radio or Internet content providers. The provided examples are not meant to limit embodiments of the invention.

In embodiments, platform 1501 may receive control signals from navigation controller 1550 having one or more navigation features. The navigation features of navigation controller 1550 may be used to interact with a user interface 1553, for example. In embodiments, navigation controller 1550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1550 may be echoed on a display (e.g., display 1545) by movements of a pointer, cursor, focus ring, or other visual indicators displayed on the display. For example, under the control of software applications 1506, the navigation features located on navigation controller 1550 may be mapped to virtual navigation features displayed on user interface 1553. In embodiments, navigation controller 1550 may not be a separate component but integrated into platform 1501 and/or display 1545. Embodiments, however, are not limited to the elements or in the context shown or described herein.

In embodiments, drivers (not shown) may include technology to enable users to instantly turn on and off platform 1501 like a television with the touch of a button after initial boot-up, when enabled, for example. Program logic may allow platform 1501 to stream content to media adaptors or other content services device(s) 1548 or content delivery device(s) 1549 when the platform is turned "off." In addition, chip set 1503 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1500 may be integrated. For example, platform 1501 and content services device(s) 1548 may be integrated, or platform 1501 and content delivery device(s) 1549 may be integrated, or platform 1501, content services device(s) 1548, and content delivery device(s) 1549 may be integrated, for example. In various embodiments, platform 1501 and display 1545 may be an integrated unit. Display 1545 and content service device(s) 1548 may be integrated, or display 1545 and content delivery device(s) 1549 may be integrated, for example. These examples are not meant to limit the invention.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1501 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
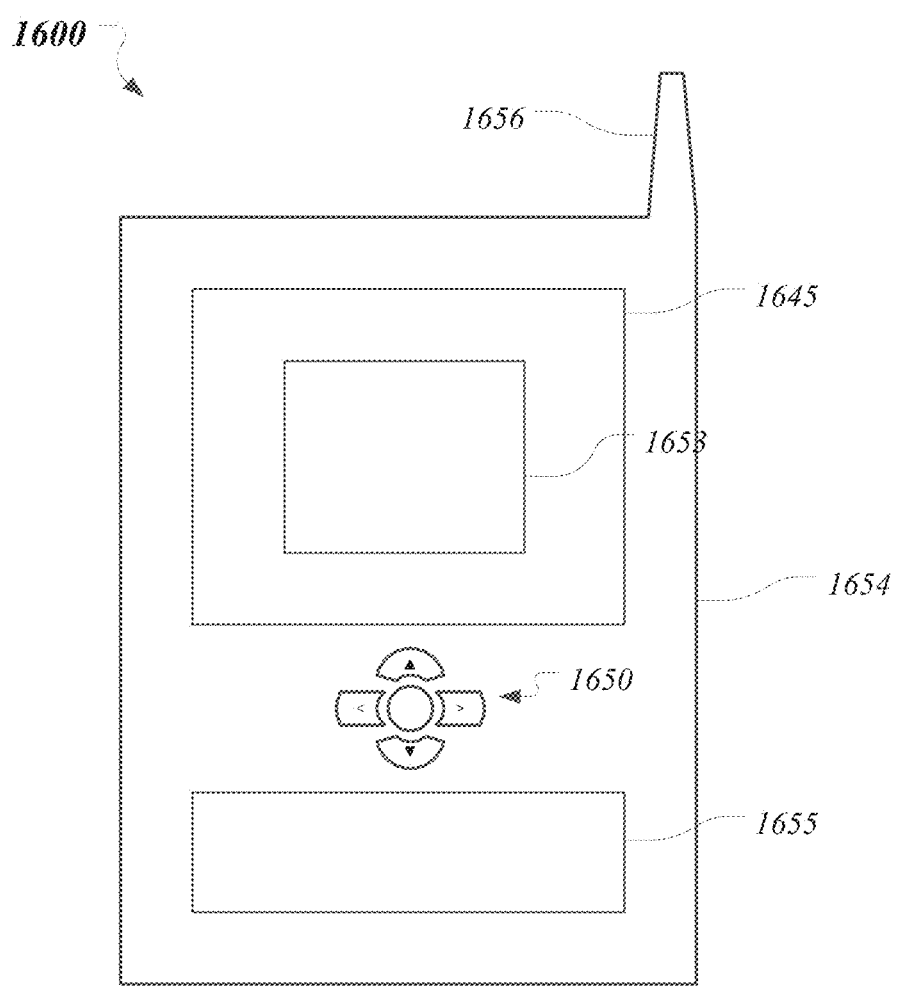
FIG. 16 illustrates one embodiment of a device.

As described above, system 1500 may be embodied in varying physical styles or form factors. FIG. 16 illustrates embodiments of a small form factor device 1600 in which system 1500 may be embodied. In embodiments, for example, device 1600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may include a display 1645, a navigation controller 1650, a user interface 1653, a housing 1654, an I/O device 1655, and an antenna 1656. Display 1645 may include any suitable display unit for displaying information appropriate for a mobile computing device, and may be the same as or similar to display 1545 in FIG. 15. Navigation controller 1650 may include one or more navigation features which may be used to interact with user interface 1653, and may be the same as or similar to navigation controller 1550 in FIG. 15. I/O device 1655 may include any suitable I/O device for entering information into a mobile computing device. Examples for I/O device 1655 may include an alphanumeric keyboard, a numeric keypad, a touch pad, input keys, buttons, switches, rocker switches, microphones, speakers, voice recognition device and software, and so forth. Information also may be entered into device 1600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of various embodiments may be implemented by one or more representative instructions stored on a machine-readable medium. In some such embodiments, the machine-readable medium may comprise a non-transitory machine-readable medium. Various embodiments may be implemented, for example, using a machine-readable medium—or an article comprising such a machine-readable medium—which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. Such a machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. Such instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language. The embodiments are not limited in this context.

Some embodiments may be implemented using a machine-readable medium—or an article comprising such a machine-readable medium—that stores an instruction or a set of instructions that, if executed by a machine, may cause the machine to fabricate logic to perform the techniques described herein. Such representations, known as "IP cores" may be stored on a tangible, machine readable medium and supplied to various customers or manufacturing facilities to load into the fabrication machines that actually make the logic or processor. The embodiments are not limited in this context.

The following examples pertain to further embodiments:

At least one machine-readable medium may comprise a plurality of instructions that, in response to being executed on a computing device, cause the computing device to determine a channel bandwidth for communication over a channel of a wireless network, generate a beamforming initiation message comprising a channel bandwidth parameter indicating the determined channel bandwidth, cause transmission of the beamforming initiation message, and receive a beamforming initiation confirmation message confirming the channel bandwidth parameter in response to the beamforming initiation message.

Such at least one machine-readable medium may comprise instructions that, in response to being executed on the computing device, cause the computing device to cause transmission of one or more messages over the channel according to the determined channel bandwidth.

Such at least one machine-readable medium may comprise instructions that, in response to being executed on the computing device, cause the computing device to perform a beamforming training sequence based on the beamforming initiation confirmation message, determine one or more beamforming parameters based on the beamforming training sequence, and cause transmission of one or more messages over the channel according to the determined channel bandwidth and the one or more beamforming parameters.

With respect to such at least one machine-readable medium, the wireless network may comprise an Institute of Electrical and Electronics Engineers (IEEE) 802.11ad Revision 9.0 wireless network, and the determined channel bandwidth may differ from a standard channel bandwidth CH_BANDWIDTH for the wireless network.

With respect to such at least one machine-readable medium, the beamforming initiation message and the beamforming initiation confirmation messages may comprise Sector Sweep (SSW) frames.

Such at least one machine-readable medium may comprise instructions that, in response to being executed on the computing device, cause the computing device to cause transmission of an SSW Feedback frame comprising the channel bandwidth parameter, and receive an SSW Acknowledgment (ACK) frame comprising the channel bandwidth parameter.

An apparatus may comprise a processor circuit and a communications management module for execution on the processor circuit to determine a channel bandwidth for communication over a channel of a wireless network, generate a beamforming initiation message comprising a channel bandwidth parameter indicating the determined channel bandwidth, transmit the beamforming initiation message, and receive a beamforming initiation confirmation message confirming the channel bandwidth parameter in response to the beamforming initiation message.

With respect to such an apparatus, the communications management module may be for execution by the processor circuit to transmit one or more messages over the channel according to the determined channel bandwidth.

With respect to such an apparatus, the communications management module may comprise a beamforming component for execution on the processor circuit to perform a beamforming training sequence based on the beamforming initiation confirmation message, determine one or more beamforming parameters based on the beamforming training sequence, and transmit one or more messages over the channel according to the determined channel bandwidth and the one or more beamforming parameters.

With respect to such an apparatus, the wireless network may comprise an Institute of Electrical and Electronics Engineers (IEEE) 802.11ad Revision 9.0 wireless network, and the determined channel bandwidth may differ from a standard channel bandwidth CH_BANDWIDTH for the wireless network.

With respect to such an apparatus, the beamforming initiation message and the beamforming initiation confirmation messages may comprise Sector Sweep (SSW) frames.

With respect to such an apparatus, the communications management module may be for execution by the processor circuit to transmit an SSW Feedback frame comprising the channel bandwidth parameter and receive an SSW Acknowledgment (ACK) frame comprising the channel bandwidth parameter.

A method may comprise determining a channel bandwidth for communication over a channel of a wireless network, generating a beamforming initiation message comprising a channel bandwidth parameter indicating the determined channel bandwidth, transmitting the beamforming initiation message, and receiving a beamforming initiation confirmation message confirming the channel bandwidth parameter in response to the beamforming initiation message.

Such a method may comprise transmitting one or more messages over the channel according to the determined channel bandwidth.

Such a method may comprise performing a beamforming training sequence based on the beamforming initiation confirmation message, determining one or more beamforming parameters based on the beamforming training sequence, and transmitting one or more messages over the channel according to the determined channel bandwidth and the one or more beamforming parameters.

With respect to such a method, the wireless network may comprise an Institute of Electrical and Electronics Engineers (IEEE) 802.11ad Revision 9.0 wireless network, and the determined channel bandwidth may differ from a standard channel bandwidth CH_BANDWIDTH for the wireless network.

With respect to such a method, the beamforming initiation message and the beamforming initiation confirmation messages may comprise Sector Sweep (SSW) frames.

Such a method may comprise transmitting an SSW Feedback frame comprising the channel bandwidth parameter, and receiving an SSW Acknowledgment (ACK) frame comprising the channel bandwidth parameter.

At least one machine-readable medium may comprise a plurality of instructions that, in response to being executed on a computing device, cause the computing device to determine a channel bandwidth for communication over a channel of a wireless network during an access period, the determined channel bandwidth differing from a standard channel bandwidth for the channel, generate a beacon message comprising a scheduling element defining the access period and a channel bandwidth parameter indicating the determined channel bandwidth for the access period, and cause transmission of the beacon message.

With respect to such at least one machine-readable medium, the wireless network may comprise an Institute of Electrical and Electronics Engineers (IEEE) 802.11ad Revision 9.0 wireless network, and the scheduling element may comprise an Extended Schedule element.

With respect to such at least one machine-readable medium, the beacon message may comprise a directional multi-gigabit (DMG) beacon frame or an Announce frame.

With respect to such at least one machine-readable medium, the access period may comprise a contention based access period (CBAP) or a service period (SP) within a data transmission interval (DTI).

An apparatus may comprise a processor circuit and a communications management module for execution on the processor circuit to receive a beacon message comprising a scheduling element defining an access period for a wireless network and a channel bandwidth parameter indicating a channel bandwidth for communication over a channel of the wireless network during the access period, the channel bandwidth differing from a standard channel bandwidth for the channel, identify the access period based on the scheduling element, determine the channel bandwidth based on the channel bandwidth parameter, and transmit one or more messages over the channel during the access period based on the channel bandwidth.

With respect to such an apparatus, the wireless network may comprise an Institute of Electrical and Electronics Engineers (IEEE) 802.11ad Revision 9.0 wireless network, and the scheduling element may comprise an Extended Schedule element.

With respect to such an apparatus, the beacon message may comprise a directional multi-gigabit (DMG) beacon frame or an Announce frame.

With respect to such an apparatus, the access period may comprise a contention based access period (CBAP) or a service period (SP) within a data transmission interval (DTI).

A system may comprise a processor circuit, a digital display communicatively coupled to the processor circuit, and a communications management module for execution on the processor circuit to determine a channel bandwidth for communication over a channel of a wireless network during an access period, the determined channel bandwidth differing from a standard channel bandwidth for the channel, generate a beacon message comprising a scheduling element defining the access period and a channel bandwidth parameter indicating the determined channel bandwidth for the access period, and transmit the beacon message.

With respect to such a system, the wireless network may comprise an Institute of Electrical and Electronics Engineers (IEEE) 802.11ad Revision 9.0 wireless network, and the scheduling element may comprise an Extended Schedule element.

With respect to such a system, the beacon message may comprise a directional multi-gigabit (DMG) beacon frame or an Announce frame.

With respect to such a system, the access period may comprise a contention based access period (CBAP) or a service period (SP) within a data transmission interval (DTI).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of instructions that, in response to being executed on a computing device, cause the computing device to:
   determine a channel bandwidth for communication over a channel of a wireless network;
   generate a beamforming initiation message comprising a channel bandwidth parameter indicating the determined channel bandwidth;
   cause transmission of the beamforming initiation message; and
   receive a beamforming initiation confirmation message comprising the channel bandwidth parameter confirming the determined channel bandwidth for communication of data in one or more messages, the beamforming initiation confirmation message to cause a beamforming operation comprising a beamforming training sequence; and
   perform the beamforming training sequence based on the beamforming initiation confirmation message, the beamforming training sequence comprising an exchange of messages for use to determine beamforming parameters.

2. The at least one non-transitory machine-readable medium of claim 1, comprising instructions that, in response to being executed on the computing device, cause the computing device to cause transmission of the one or more messages over the channel according to the determined channel bandwidth.

3. The at least one non-transitory machine-readable medium of claim 1, comprising instructions that, in response to being executed on the computing device, cause the computing device to:
   determine one or more beamforming parameters based on the beamforming training sequence; and
   cause transmission of the one or more messages over the channel according to the determined channel bandwidth and the one or more beamforming parameters.

4. The at least one non-transitory machine-readable medium of claim 1, the wireless network comprising an Institute of Electrical and Electronics Engineers (IEEE) 802.11ad Revision 9.0 wireless network, the determined channel bandwidth differing from a standard channel bandwidth CH_BANDWIDTH for the wireless network.

5. The at least one non-transitory machine-readable medium of claim 4, the beamforming initiation message and the beamforming initiation confirmation messages comprising Sector Sweep (SSW) frames.

6. The at least one non-transitory machine-readable medium of claim 4, comprising instructions that, in response to being executed on the computing device, cause the computing device to:
   cause transmission of an SSW Feedback frame comprising the channel bandwidth parameter; and
   receive an SSW Acknowledgment (ACK) frame comprising the channel bandwidth parameter.

7. An apparatus, comprising:
   a processor circuit; and a communications management module for execution on the processor circuit to:
  determine a channel bandwidth for communication over a channel of a wireless network;
  generate a beamforming initiation message comprising a channel bandwidth parameter indicating the determined channel bandwidth;
  transmit the beamforming initiation message;
  receive a beamforming initiation confirmation message comprising the channel bandwidth parameter confirming the determined channel bandwidth for communication of data in one or more messages, the beamforming initiation confirmation message to cause a beamforming operation comprising a beamforming training sequence; and
    perform the beamforming training sequence based on the beamforming initiation confirmation message, the beamforming training sequence comprising an exchange of messages for use to determine beamforming parameters.

8. The apparatus of claim 7, the communications management module for execution by the processor circuit to transmit the one or more messages over the channel according to the determined channel bandwidth.

9. The apparatus of claim 7, the communications management module comprising a beamforming component for execution on the processor circuit to:
  determine one or more beamforming parameters based on the beamforming training sequence; and
  transmit the one or more messages over the channel according to the determined channel bandwidth and the one or more beamforming parameters.

10. The apparatus of claim 7, the wireless network comprising an Institute of Electrical and Electronics Engineers (IEEE) 802.1 lad Revision 9.0 wireless network, the determined channel bandwidth differing from a standard channel bandwidth CH_BANDWIDTH for the wireless network.

11. The apparatus of claim 10, the beamforming initiation message and the beamforming initiation confirmation messages comprising Sector Sweep (SSW) frames.

12. The apparatus of claim 10, the communications management module for execution by the processor circuit to:
  transmit an SSW Feedback frame comprising the channel bandwidth parameter; and
  receive an SSW Acknowledgment (ACK) frame comprising the channel bandwidth parameter.

13. A method, comprising:
  determining a channel bandwidth for communication over a channel of a wireless network;
  generating a beamforming initiation message comprising a channel bandwidth parameter indicating the determined channel bandwidth;
  transmitting the beamforming initiation message;
  receiving a beamforming initiation confirmation message comprising the channel bandwidth parameter confirming the determined channel bandwidth for communication of data in one or more messages, the beamforming initiation confirmation message to cause a beamforming operation comprising a beamforming training sequence; and
  perform the beamforming training sequence based on the beamforming initiation confirmation message, the beamforming training sequence comprising an exchange of messages for use to determine beamforming parameters.

14. The method of claim 13, comprising transmitting the one or more messages over the channel according to the determined channel bandwidth.

15. The method of claim 13, comprising:
  determining one or more beamforming parameters based on the beamforming training sequence; and
  transmitting the one or more messages over the channel according to the determined channel bandwidth and the one or more beamforming parameters.

16. The method of claim 13, the wireless network comprising an Institute of Electrical and Electronics Engineers (IEEE) 802.1 lad Revision 9.0 wireless network, the determined channel bandwidth differing from a standard channel bandwidth CH_BANDWIDTH for the wireless network.

17. The method of claim 16, the beamforming initiation message and the beamforming initiation confirmation messages comprising Sector Sweep (SSW) frames.

18. The method of claim 16, comprising:
  transmitting an SSW Feedback frame comprising the channel bandwidth parameter; and
  receiving an SSW Acknowledgment (ACK) frame comprising the channel bandwidth parameter.

* * * * *